United States Patent [19]

Lawton, II

[11] 4,122,072
[45] Oct. 24, 1978

[54] POLYESTER AND PROCESS FOR MAKING SAME

[75] Inventor: Ernest L. Lawton, II, Durham, N.C.

[73] Assignee: Monsanto Company, St. Louis, Mo.

[21] Appl. No.: 691,659

[22] Filed: Jun. 1, 1976

[51] Int. Cl.$^2$ .......................................... C08G 63/12
[52] U.S. Cl. .................................. 528/289; 8/168 C; 8/179; 8/180; 260/864
[58] Field of Search ........................... 8/168, 179, 180; 260/75 N, 864

[56] References Cited

U.S. PATENT DOCUMENTS

| | | | |
|---|---|---|---|
| 2,744,087 | 5/1956 | Snyder | 260/75 R |
| 2,895,946 | 7/1959 | Huffman | 260/75 |
| 2,905,657 | 9/1959 | Huffman | 8/179 X |
| 2,921,828 | 1/1960 | Caldwell | 8/168 C X |
| 3,625,754 | 12/1971 | Dunn | 8/179 X |
| 3,652,734 | 3/1972 | Farber et al. | 8/180 X |
| 3,856,754 | 12/1974 | Habermeier | 260/75 N |
| 3,937,753 | 2/1976 | Hahn et al. | 269/860 |
| 3,937,755 | 2/1976 | Hahn et al. | 260/860 |

FOREIGN PATENT DOCUMENTS 978,193 11/1975 Canada.

OTHER PUBLICATIONS

Chem. Abs. Refs. 83:P44170y; 83:P44021a; 83:P180425n; 83:P180260e; 83:P132281r; 83:P133575b; 83:P132285v; 83:P195400z; 83:90097p; 82:P126694r; 82:P99617j; 81:152822e; 67:P65006j.
Judd et al, Color in Business, Science, and Industry, 3 ed., (Wiley & Sons, 1975) pp. 420-438.
Morrison and Boyd, Organic Chemistry (Allyn & Bacon, 1974) pp. 672-673.
Kirk-Othmer, Encyclopedia of Chemical Technology, 2 rev. ed., vol. 16, pp. 162-168, 176.

Primary Examiner—Thomas De Benedictis, Sr.
Attorney, Agent, or Firm—Donald J. Fitzpatrick

[57] ABSTRACT

Fiber forming polyesters are modified by the incorporation in the chain of hydantoin derivatives having polyalkoxylated groups linked to the ring nitrogens. These polyesters exhibit desirable properties such as improved dyeability, thermal oxidative stability, light stability and dyed light fastness.

20 Claims, 2 Drawing Figures

FIG. I.

POLYESTER AND PROCESS FOR MAKING SAME

BACKGROUND OF THE INVENTION

1. Field of the Invention

This invention relates to a new polyester composition comprising linear polymers produced by condensation reactions of polymethylene glycols and dicarboxylic acids or their esters, and more particularly to such polyester compositions containing a hydantoin derivative that exhibit improved dyesability, thermal oxidative stability, light stability and dyed light fastness, compared to other polyalkoxy-modified polyesters.

2. Description of the Prior Art

It is well known that the polymeric polyesters prepared by polycondensation of a dihydric alcohol or its functional derivatives and a dicarboxylic acid or a polyester-forming derivative thereof, such as an acid halide, or a simple ester of a dibasic acid and a volatile monohydric alcohol are excellent fiber-forming polymers. Commercially the most important polyesters are those prepared by the condensation of terephthalic acid or dimethyl terephthalate and a polymethylene glycol containing from two to ten carbon atoms, and particularly ethylene glycol. These polyesters are relatively inert hydrophobic materials capable of being formed into filaments which can be drawn to produce textile fibers of superior strength and pliability. However, since these materials are not readily permeable to water, they cannot be satisfactorily dyed by the ordinary dyeing procedures such as used in dyeing cotton, wool, natural silk and regenerated cellulose.

Further limitations in the development of polyethylene terephthalate fibers for cloths, include the problem of pilling and the hard touch of clothing. The compart molecular structure of polyethylene terephthalate fibers makes it quite difficult, except with a limited number of dyes, to obtain a high degree of dyebath exhaustion or to secure satisfactory deep shades. Absorption and penetration of the dye into the fiber core are limited by the inherebt properties of the fiber. A number of methods have been proposed to increase the dyeability of polyesters; however, most have not proved to be entirely satisfactory. One such method is to copolymerize a third component in addition to terephthalic acid and ethylene glycol as the main components to eliminate or minimize the limitations of polyethylene terephthalate fibers, and especially improve the ease of dyeing. Generally, the amount of the third component is kept small, with the intention of improving a certain portion of the physical properties and keeping the other properties of the polyethylene terephthalate fiber unchanged.

For example, in U.S. Pat. No. 2,905,657 the dyeability of polyethylene terephthalate has been improved by the addition of a third component that functions as a chain-terminating agent. By adding a minor proportion of monohydroxy compounds to polyethylene terephthalate polymers the polymers are more readily dyeable to deeper and more uniform colors than the unmodified polyethylene terephthalate. It has been found, however, that although the dye affinity of the polyester has been increased, other desirable properties of the filament produced from the polyester have been sacrificed. Employing chain terminating monohydroxy compounds in the polymer molecule causes a reduction in the molecular weight of the polyester as evidenced by a reduction in its viscosity. To overcome this disadvantage while still retaining the benefit of the dye affinity exhibited by the chain terminating compounds U.S. Pat. No. 2,895,946 disclosed the incorporation of a small amount of a chain-branching agent in the polyester reaction mixture, along with a chain terminating agent, so that a polyester can be produced which not only possesses the desired dye affinity but also has the necessary molecular weight. However, it has been found that this modified polyester cannot be melt spun into a textile fiber at the same rate as the unmodified polyethylene terephthalate fiber. The increased production cost therefore offsets in a large measure the advantage of improved dyeability provided by the modifying additives.

Another approach to improving the dyeability of polyethylene terephthalate fibers is disclosed in U.S. Pat. No. 2,744,087. In this patent a third component is added to provide a more readily dyeable copolyester. This component is polyethylene glycol and provides an improvement over unmodified polyethylene terephthalate with respect to dyeability. It has been found that this product suffers from thermal instability; and accordingly, its practical application has been severely restricted.

The dyeability of polyethylene terephthalate fibers can also be improved by using carriers or pressurized and high temperature dyeing equipment. Carriers or accelerants, however, increase dyeing costs and frequently impair quality by spotty or non-uniform dyeing. Likewise, the use of high temperature dyeing increases fabric cost because of the expensive specialized equipment involved in such dyeing.

An extremely desirable property that enhances the utility of polyesters is thermal stability. This is an important property because many processes for polyesters fibers and fabrics involve exposure to heat in air for varying periods of time. Such heating is usually employed in dyeing the fibers, heat setting the fibers for enhanced dimensional stability and in texturing the fibers to improve recovery characteristics of woven fabrics. Processing polyester filaments, staple, blends, fabrics and the like may require subjecting the polyester product to temperatures up to 230° C. For satisfactory performance of these fibers and fabrics in various end uses, stability of the polymer to these processing conditions therefore is an essential requirement.

Ordinarily, in the commercial manufacture of polyester filaments, fiber and the like, the filaments may be subjected to a heat-set treatment at temperatures in the 100°-200° C range subsequent to the orientation drawing of the filament, but prior to end use processing. For example, heat setting of crimped polyester filaments prior to being cut into staple is often accomplished in the 100° to 150° C temperature range and heat setting dyed and undyed fabrics to achieve dimensional stability is typically in the 150°-200° C temperature range.

It is therefore the goal of those skilled in the art to produce thermally stable polyesters having improved dyeability without the need of carriers and the utilization of expensive equipment by a simple modification of the basic polymer molecule. Thermally stable polyesters exhibiting such properties would be very useful having significant commercial and practical value.

SUMMARY OF THE INVENTION

Desirable properties such as improved dyeability, thermal oxidative stability, light stability and dyed light fastness are imparted to linear condensation polyesters by the incorporation therein of hydantoin compounds having polyalkoxylated groups linked to the nitrogens within the basic 5member ring. A particular efficacious polymer of this class is one wherein the weight percent of the polyalkoxylated hydantoin containing group is not more than about 20 percent of the polymer weight. It has been found that fibers spun from polyesters containing these hydantoin compounds show significant improvement over fibers obtained from unmodified polyethylene terephthalate while at the same time the desirable properties of such polyethylene terephthalate fibers are substantially retained.

It is therefore an object of this invention to provide polyesters having increased dyeability, thermal oxidative stability, light stability and dyed light fastness.

A further object of this invention is to provide a process for preparing polyesters from polyethylene terephthalate and derivatives thereof that exhibit the aforesaid desirable properties.

It is another object of this invention to provide a novel polyester modified with a polyalkoxylated hydantoin compound.

A still further object of this invention is to provide a novel fiber forming polyester modified with a polyalkoxylated hydantoin compound.

It is another object of this invention to provide a new process for improving the properties of polyesters and particularly polyethylene terephthalate and derivatives thereof by copolymerizing therewith a comonomer having a polyalkoxylated hydantoin compound.

It is likewise an object of this invention to provide a new composition of matter having up to 20 percent by weight of a polyalkoxylated hydantoin compound.

These and other objects are accomplished by providing homopolyesters and copolyesters both random and block copolymers having the formula:

$$-\overset{O}{\underset{\|}{C}}-A-\overset{O}{\underset{\|}{C}}-O-G-O-$$

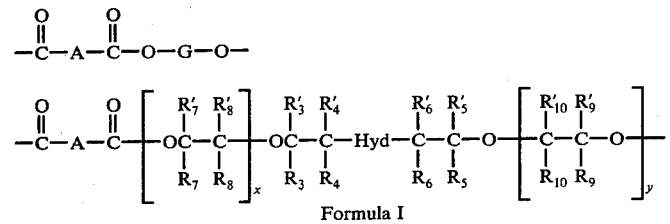

Formula I wherein A is individually selected from the group of aromatic divalent radicals consisting of

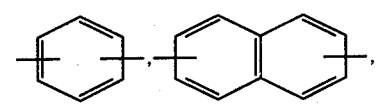

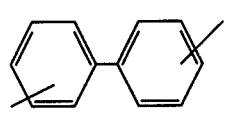

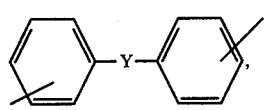

and branched or linear alkylene radicals containing from 4 to 10 carbon atoms, and the A groups may be more specifically derived from terephthalic acid, isophthalic acid, p,p'-dicarboxylbiphenyl, p,p'-dicarboxydiphenylsulfone, p,p'-dicarboxydiphenylmethane, and aliphatic, cycloaliphatic, and aryl esters and half-esters, ammonium and amine salts, and the acid halides of the above named compounds, and the like. Examples of such alkylene radicals are those derived from azelaic acid and adipic acid, wherein Y is selected from the group of difunctional radicals consisting of a branched or linear $C_1$-$C_4$ alkylene, —O—, —S—, and —SO$_2$—; wherein G is derived from the group of divalent radicals consisting of a branched or linear $C_2$- $C_{10}$ alkylene and $C_5$ - $C_{10}$ cycloalkylene; and more specifically is derived from a glycol of the series HO(CH$_2$)$_n$OH, in which $n$ is an integer from 2 to 10 or cycloaliphatic glycols with one or more dicarboxalic acids or ester-forming derivatives thereof, the symbol "Hyd" denotes a difunctional hydantoin radical, having the following formula:

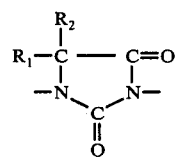

Formula II

"Hyd" may also be selected from the group consisting of

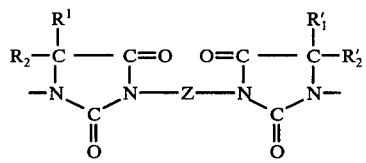

Formula IIa

(I)

(II)

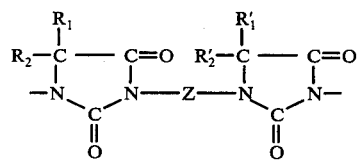

Formula IIb

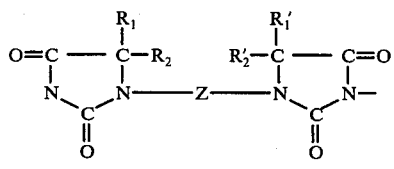

Formula IIc wherein Z is a radical individually selected from the group consisting of divalent alkyls containing from 1–20 carbon atoms, bivalent aryls containing from 6–10 carbon atoms, bivalent alkyl-aryls containing from 6–20 carbon atoms and cycloalkylene containing from 5–12 carbon atoms; and $R_1'$, $R_2$, $R_1'$ and $R_2'$ are individually selected from the group of radicals consisting of hydrogen, aryls containing from 6–10 carbon atoms, alkyls containing from 1-20 carbon atoms, and cycloalkyls containing from 5-10 carbon atoms, $R_1$ and $R_2$, $R_1'$ and $R_2'$ may be conjointly a tetramethylene radicals or a pentamethylene radicals, $R_3$, $R_3'$, $R_5$, $R_5'$, $R_7$, $R_7'$ and $R_9$, $R_9'$ are individually selected from the group of radicals consisting of hydrogen, methyl, ethyl and saturated cycloalkys containing from 5-10 carbon atoms; $R_4$, $R_4'$, $R_6$, $R_6'$, $R_8$, $R_8'$, $R_{10}$, $R_{10}'$ are hydrogen or $R_3$ and 4, 4,$R_5$ and $R_6$, $R_7$ and $R_8$, $R_9$ and $R_{10}$ may be cojointly a tetramethylene radical; wherein $x$ is an integer from 0-20, $y$ is an integer from 0-20 and the sum of $x+y$ is at least 1 and the weight percent of units II is not more than 20.

In a more preferred embodiment Hyd is represented by a bivalent radical shown as Formula II and $R_1$ and $R_2$ are $CH_3$; $R_3'$, $R_4$, $R_5$, $R_5'$, $R_6$, $R_6'$, $R_7$, $R_7'$, $R_8$, $R_8'$, $R_9$, $R_9'$ and $R_{10}$, $R_{10}'$ are hydrogen; the sum of x and y is an integer from 1-20 and more preferably an integer from 4-15;

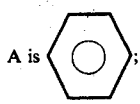

A is and G is $-CH_2-CH_2-$. These polymers have the repeating structural units:

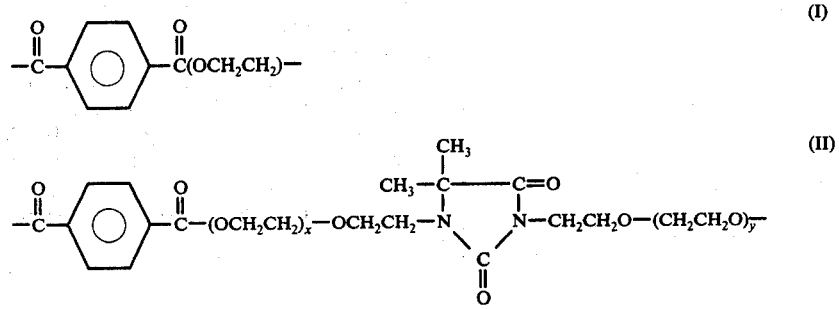

Formula III and the weight percent of units II is from about 4 to about 10 weight percent of the total copolymer weight.

Examples of the polyhydric alcohols which may be employed in practicing the instant invention are ethylene glycol, trimethylene glycol, and tetramethylene glycol, cyclohexane dimethanol, and the like. Polyethylene terephthalate, however, is the preferred polymer because of the ready availability of terephthalic acid or dimethyl terephthalate and ethylene glycol, from which it is made. It also has a relatively high melting point of about 250° through 265° C., and this property is particularly desirable in the manufacture of filaments in the textile industry.

DESCRIPTION OF THE DRAWINGS

Reference is now made to the accompanying drawings wherein.

DESCRIPTION OF THE PREFERRED EMBODIMENTS

Figure 1:
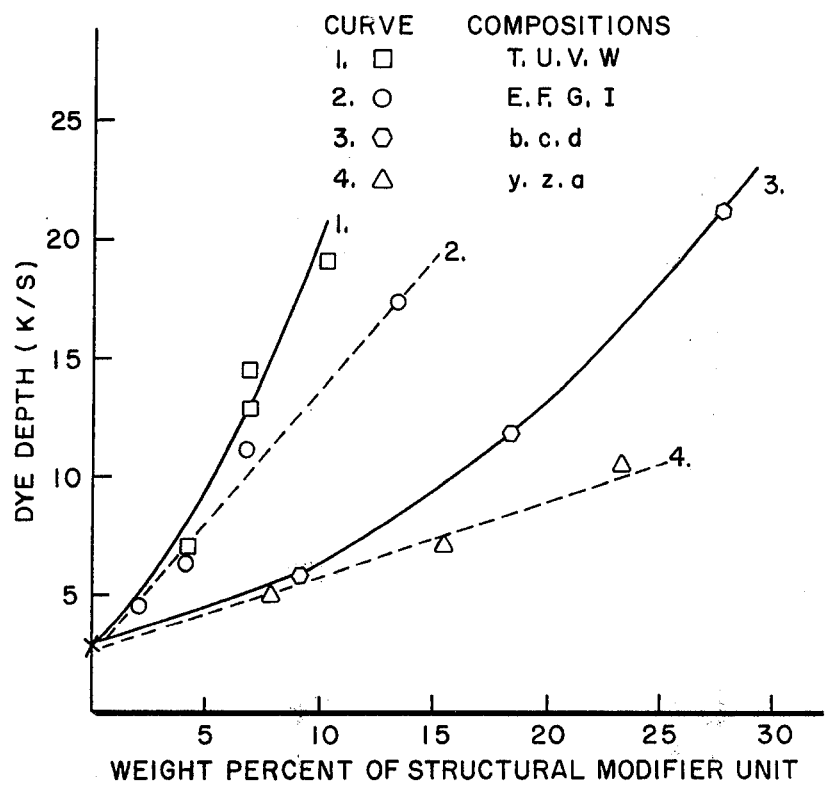
FIG. 1 is a graph showing as the ordinate dye depth (K/S) and as the abscissa the weight percent of structural modifier repeat unit. The effect of the presence of the hydantoin unit in the composition on dye depth is shown.

The synthetic linear condensation polyesters contemplated in the practice of the invention are those formed basically from dicarboxylic acids and glycols, and copolyesters or modifications of these polyesters and copolyesters. In a highly polymerized condition, these polyesters and copolyesters can be formed into filaments and the like and subsequently permanently oriented by drawing. Among the polyesters and copolyesters specifically useful in the instant invention are those resulting from reacting one or more of the glycols of the series $HO(CH_2)_nOH$, in which "$n$" is an integer from 2 to 10, or cycloaliphatic glycols, with one or more dicarboxylic acids or ester-forming derivatives thereof. Among the dicarboxylic acids and ester-forming derivatives thereof useful in the present invention there may be named terephthalic acid, isophthalic acid, 2, 6-naphthalene dicarboxylic acid, p,p'-dicarboxybiphenyl, p,p'-dicarboxydiphenylsulfone, p,p'-dicarboxyldiphenylmethane, and the aliphatic, cycloaliphatic, and aryl esters and half-esters, and the acid halides of the above-named compounds, and the like or mixtures of these compounds. Examples of the polyhydric alcohols which may be employed in practicing the instant invention are ethylene glycol, trimethylene glycol, and tetramethylene glycol, cyclohexane dimethanol, and the like or mixtures of these compounds. Polyethylene terephthalate modified with a hydantoin compound, however, is the preferred polymer because of the ready availability of terephthalic acid or dimethyl terephthalate and ethylene glycol, from which it is made. It also has a relatively high melting point of about 250° through 265° C., and this property is particularly desirable in the manufacture of filaments in the textile industry.

It has been found that the thermal stability and dyeability of these synthetic linear condensation polyesters can be significantly improved by the incorporation of hydantoin derivatives into the polymer structure. These modifiers contain polyalkoxylated groups linked to each of the nitrogens within the basic 5 member ring.

The hydantoin derivatives employed in this invention have the following formula:

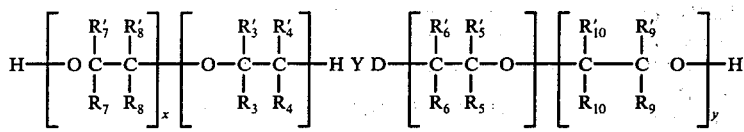

Formula IV in which the symbol "Hyd" denotes a difunctional hydantoin radical, having the structure shown in Formulae II, IIa, IIb or IIc.

A more preferred embodiment of the hydantoin derivative employed in this invention has the following formula:

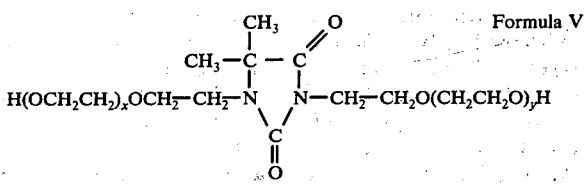

Formula V wherein the sum of $x$ and $y$ is an integer from 1–20 and more preferably an integer from 4 to 15.

The hydantoin derivatives have linked to each of the nitrogens a hydroxyalkyl group having at least two carbon atoms. These groups result from reacting with the hydantoin ring one or more moles of ethylene oxide, propylene oxide or butylene oxide, cyclohexane oxide, and/or styrene oxide in a typical polyalkoxylation. The preparation of such hydantoin derivatives is disclosed in Canadian Pat. No. 978,193.

The improved properties in polyesters containing the hydantoin derivative are believed to result from the combined effect of the 5 member ring and the polyalkoxy group having at least 2 carbon atoms linked to each of the ring nitrogens. These polyalkoxy groups are designated as x and y in Formula V. It is believed that the polyalkoxy groups of the derivative are responsive for improving dyeability whereas the 5 member ring functions to improve thermal stability. If the sum of the $x+y$ component appreciably exceeds 30, the beneficial effect of the ring is diminished and thermal stability impaired.

It has been found that the broad range for the $x+y$ component can be an integer up to about 30, without diminishing the contribution of the hydantoin ring, with a more intermediate range from 1–20 and a preferred range from 4–15. Since the alkylene oxide is not incorporated uniformly between the two nitrogens in a given molecule or between various molecules, the indices $x$ and $y$ in the formulae represent the average degree of polyaddition of the various alkylene oxide chains with different lengths.

The amount of the polyethoxy hydantoin terephthalate repeat unit shown as unit II in Formula III may be broadly present as a modifier in concentrations from about 0.5 to 20 weight percent of the copolymer. A more narrow and intermediate range is from about 2 to 15 weight percent and preferably from about 4 to about 10 weight percent, based on the weight of the copolymer.

The use of polymers of hydantoin derivatives other than for applications contemplated herein is known. For instance U.S. Pat. No. 3,856,754 discloses homopolyesters and copolyesters having higher glass transition temperatures, lower melt temperatures and softening temperatures, thus showing better thermo-mechanical properties. U.S. Pat. No. 3,893,979 relates to polyethereurethanes containing hydantoin rings, the presence of such rings imparting improved antistatic properties and light fastness. These hydantoin derivatives of the prior art do not produce the improved polyester properties obtained by the use of the polyalkoxylated hydantoin modifier contemplated by this invention as will hereinafter be shown in the accompanying examples.

The hydantoin derivatives employed in practicing this invention can be present in the copolymer as a random distribution or as a block segment, or as an admixture such as a blend. Regardless of the manner of incorporation of the hydantoin derivative improved results are achieved.

When structural unit II is introduced into the copolyester through esterification of a polyalkoxylated hydantoin diol, the polyalkoxy chains are nonreactive under polyesterification conditions while the terminal diol functionalities are reactive. Structural unit II therefore occurs at random in the copolyester chains. Structural unit II may also be introduced by blending two homopolyesters having as repeat units structural units I and II, respectively. In the molten state, structural units I and II of the two homopolyesters will undergo ester interchange reactions resulting in the formation of a copolyester containing units I and II. At shorter reaction times, the copolyester will be composed of block segments containing recurring structural units I and II, respectively. At longer reaction times, the occurrence of units I and II in the copolyester chain will become random.

In preparing the polymer, the dibasic acid or ester forming derivative thereof, and the hydantoin compound may be charged to the reaction vessel at the beginning of the first stage of the esterification reaction, the reaction proceeds as in any well-known esterification polymerization process.

When preparing the polyester from an ester, such as dimethyl terephthalate the first stage of reaction may be carried out at 170° C to 180° C and at a pressure of 0 to 7 p.s.i.g. (5.0 Kg/cm$^2$). If the polyester is prepared from the acid, such as terephthalic acid, the first stage of reaction may be carried out at about 220° to 260° C. and at pressures of from atmospheric to about 60 p.s.i.g. (4.2 Kg/cm$^2$). The methanol or water evolved during the first stage of reaction is continuously removed as a gas. At the completion of the first stage, the excess glycol, if any, is distilled off prior to entering the second stage of the reaction.

In a second or polymerization stage, the reaction may be conducted at reduced pressures and preferably in the presence of an inert gas, such as a nitrogen blanket over the reactants, the blanket containing less than 0.003 percent oxygen. For optimum results, a pressure within the range of less than 1 mm. up to 5 mm. of mercury is employed. This reduced pressure is necessary to remove the free ethylene glycol and water that are formed during this stage of the reaction, the ethylene glycol being volatilized under these conditions and removed from the system. The polymerization step is conducted at a temperature in the range of 200° to 300° C. This stage of the reaction may be effected either in the liquid melt or solid phase. In the liquid phase, particularly, reduced pressures should be employed in order to remove the free ethylene glycol which emerges from the polymer as a result of the condensation reaction.

Although the process of this invention may be conducted batchwise, it is particularly adaptable for use in the continuous production of polyesters. In the preparation of the described polyesters, the first stage of the reaction takes place in approximately ¾ to 2 hours. The use of an ester-interchange catalyst is desirable when starting with dimethyl terepthalate. In the absence of a catalyst, times up to 6 hours may be necessary in order to complete this phase of the reaction. In the polymerization state, a reaction time of approximately 1 to 4 hours may be employed with a time of 1 to 3 hours being the optimum, depending on catalyst concentration, temperature, viscosity desired, and the like.

The linear condensation polyesters, produced in accordance with the present invention, normally have specific viscosities in the order of about 0.25 to 0.6 which represent the preferred fiber and filament-forming polymers. It is to be understood, of course, that nonfiber-forming polyesters may be produced by means of the present invention which have a greater or less melt viscosity than that specified above.

As used herein the term "filament" is generic, and not meant to exclude staple fiber.

As used herein the term "polyester" is a fiber forming composition of matter having a long chain synthetic polymer comprising at least 85 percent by weight of structural units I and II as shown in Formula I.

The modified polyester compositions of the present invention are useful in the production of shaped articles by extrusion, molding, or casting in the nature of yarns, fibers, films, pellicles, bearings, ornament, or the like. They are particularly useful in the production of thermally stable textile fibers having improved dyeability, particularly with disperse dyes.

The polyesters of this invention may be produced to form filaments and films by melt-spinning methods and can be extruded or drawn in the molten state to yield products that can be subsequently drawn to the extent of several hundred percent of their original lengths, whereby molecularly oriented structures of high tenacity may be obtained. The condensation product can be cooled and comminuted followed by subsequent remelting and processing to form filaments, films, molded articles, and the like.

Alternatively, the polyesters of this invention may be processed to shaped objects by the wet-spinning method, wherein the polyesters are dissolved in a suitable solvent and the resulting solution is extruded through a spinnerette into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity and to induce molecular orientation therein. Other treating and processing steps may be given the oriented filaments.

If it is desired to produce shaped articles from the polyesters of the present invention which have a modified appearance or modified properties, various agents may be added to the polyester prior to the fabrication of the articles or those agents may be incorporated with the initial reactants. Such added agents might be plasticizers, antistatic agents, fire-retarding agents, stabilizers, and the like.

An important feature of the instant invention is that the polyethylene terephthalate can be modified with the hydantoin containing diol without any substantial change in reaction conditions normally employed in making unmodified polyethylene terephthalate. This will be a readily apparent advantage from the standpoint of commercial operation. The resulting copolymers may be spun and processed under conditions without substantial modification from those used for unmodified polyethylene terephthalate fibers.

The efficiency of adding polyalkoxylated hydantoin derivatives to polymers was determined by subjecting compositions prepared in a manner hereinafter more fully discussed to one or more of the following tests. The tests and their procedures are as follows:

THERMAL STABILITY

Thermal stability was determined in air and nitrogen atmospheres and this property was measured by two different procedures. In one method knit tubing prepared from fibers described in the following examples was scoured using a 40:1 liquor to fabric ratio in an aqueous scour bath containing 2 gram/liter of Varsol, 1 gram/liter of Igepal CO-630 purchased from GAF Corporation under the trademark "Igepal" (nonylphenoxypoly [ethylene oxy]ethanol), and 0.5 gram/liter of sodium hydroxide. Tubing was scoured for 20 minutes at 93° C. and rinsed in hot tap water. The tubing was then rinsed in an aqueous bath containing 0.5 gram/liter of acetic acid with 40:1 liquor to fabric ratio for 10 minutes at 43° C. The tubing was rinsed in hot tap water and dried at 60° C. The tubings were allowed to equilibrate at room conditions for at least 24 hours. The specific viscosity of the scoured tubing samples was then determined.

Thermal oxidative stability was determined by then heating the tubing in a forced air oven at various temperatures for intervals of 5 and 15 minutes. The specific viscosity of the fibers was again determined after this heating. The change in viscosity is indicative of the fiber's thermal oxidative stability. For a given copolymer composition, a decrease in viscosity upon heating is indicative of oxidative degradation resulting in a reduction of copolymer molecular weight.

In the second method thermal stability is measured by determining the temperature at which significant weight loss of the polymer due to thermal degradation commences. The fibers are heated in a thermal gravimetric analyzer in an air or nitrogen atmosphere. The temperature at which this initial loss of weight occurs in fibers containing polyalkoxylated structures is indicative of fiber stability to thermal oxidative degradation. These fibers were heated in temperature increments at 10° C per minute in a duPont 950 Thermal Gravimetric Analysis Apparatus with air or nitrogen flow rate of 500 $cm^3$ per minute.

COLORFASTNESS TO LIGHT

The complete test method appears in the American Association of Textile Chemists and Colorists Technical Manual Vol. 50, 1974 identified as test method 16–1974. Dyed specimens were exposed to a water-cooled xenon arc lamp as described in this test. The degree of contrast between the exposed and unexposed specimen was graded visually against the contrast of a pair of pieces of paper illustrating the steps of the International Geometric Gray Scale for Evaluating Change in Color and the colorfastness to light for the specimen was then obtained.

NITROGEN ANALYSIS

Molar percentages and weight percentages of the hydantoin derivatives in the copolymers can be confirmed experimentally by knowing the percent nitrogen contained in the derivative. The derivatives employed in this invention prior to incorporation into the polymer contain from about 1 to 10 percent by weight of nitrogen dependent upon the extent of poly (alkoxylation). Determining the percent nitrogen in the final product reflects the total amount of the derivative that is reacted or contained in this product. During polymerization the N-poly(alkyoxylated) dimethylhydantoin preferentially displaces ethylene glycol which is more easily vaporized. The nitrogen containing hydantoin derivative then enters the polymer chain. From nitrogen analysis of the copolymer, the weight percent of poly(alkoxylated) dimethylhydantoin repeat units may be confirmed experimentally within reasonable limits.

SPECIFIC VISCOSITY

Specific viscosity ($\eta_{sp}$) is measured at a concentration of .5g/deciliter unless stated otherwise of the polymer in a solvent having a weight ratio: 60% phenol/40% tetrachloroethane; by measuring the efflux time using a modified Ostwald-Cannon-Fenske viscometer. Efflux time of the solvent is measured similarly and the specific viscosity ($\eta_{sp}$) can then be calculated using the formula:

$$\eta_{sp} = \frac{n \text{ solvent}}{n \text{ solution}} - 1$$

DYE DEPTH

The depth of dyeing was measured from reflectance values of fabrics dyed with a standard commercial dye, measured at 680 nm and expressed as the ratio of absorption coefficient to scattering coefficient (K/S) calculated from the Kubelka and Munk equation as described in Deane B. Judd and Gunter Wysjecki; Color in Business, Science, and Industry, Third Edition, John Wiley, New York, 1975, pages 420–438.

MOISTURE REGAIN

Moisture regain was measured by determining the amount of moisture pick-up after the fibers were dried. All of the moisture is initially removed so that the fibers can be considered to be "bone-dry". Scoured knit tubing was dried for 24 hours at 115° C. The tubing is weighed and then conditioned in glass desiccators containing saturated aqueous salt solutions in a controlled temperature room at 23° C. to a specific percent relative humidity. The conditioned samples are reweighed and the percent moisture regain or the amount of water picked up by the dry fiber is determined from the relationship:

$$\% \text{ regain} = \frac{\text{wet weight} - \text{dry weight}}{\text{dry weight}} \times 100.$$

The following specific examples will serve to facilitate a better understanding of the invention and appreciation of its advantages. It will be understood that the examples given are by way of exemplification only and are not to be considered as limiting the scope of the invention.

The compositions employed in illustrating this invention are set forth below in Tables I and II. It should be noted that each composition contains a brief generic description. This description enables one to readily discern the compositions of this invention and distinguish them from the prior art. Table II includes some of the more important physical properties of these compositions such as draw ratio, melting point, specific viscosity, denier and tensile properties. The percent nitrogen of certain compositions are also reported.

TABLE I

| Composition | Run No. | Description of Polymerized Products | Modifier Description | Weight Percentage of Modifier Based Upon Calculated Weight of Polymer |
|---|---|---|---|---|
| A | 172135 | poly ethylene terephthalate | None | None |
| t | CP289 | " | " | |
| B | 172134 | ethylene terephthalate copolymers prepared with 1,3-poly(ethoxylated) 5,5-dimethylhydantoin diol | x+y=5 | 5.61 |
| C | 172132 | " | " | 8.42 |
| D | 172107 | " | " | 11.24 |
| l | P0101A | " | " | 4.79 |
| E | 172131 | " | x+y=10 | 1.68 |
| F | 172130 | " | 3.36 | |
| G | 172125 | " | " | 5.59 |
| H | 172188 | " | " | 5.59 |
| I | 172108 | " | " | 11.18 |
| J | 175267 | " | " | 16.76 |
| R | 172187 | " | " | 4.97 |
| m | PO73A | " | " | 4.78 |
| q | CP287 | " | " | 4.78 |
| K | 175243 | " | x+y=15 | 3.35 |
| u | 180327 | " | " | 5.58 |
| L | 175266 | " | " | 8.37 |
| M | 175242 | " | " | 8.37 |
| Q | 190340 | " | " | 4.96 |
| n | PO112A | " | " | 4.78 |
| N | 180301 | " | x+y=20 | 5.58 |
| S | 175289 | ethylene terephthalate copolymers prepared with poly(ethoxy)diol | Mol. Wt.=400 | 5.61 |
| T | 175295 | " | Mol. Wt.=600 | 3.36 |
| U | 175285 | " | " | 5.60 |
| V | 175296 | ethylene terephthalate copolymers prepared with poly(ethoxy)diol | Mol. Wt.=600 | 5.60 |
| W | 175293 | " | " | 8.39 |
| r | CP290 | " | " | 4.78 |
| X | 175292 | " | Mol. Wt.=1000 | 5.58 |

TABLE I-continued

| Composition | Run No. | Description of Polymerized Products | Modifier Description | Weight Percentage of Modifier Based Upon Calculated Weight of Polymer |
|---|---|---|---|---|
| Y | 180303 | ethylene terephthalate copolymers prepared with 1,1'-methylene-bis-[3(B-hydroxyethyl)-5,5-dimethylhydantoin] | None | 5.62 |
| Z | 180322 | " | " | 11.28 |
| a | 180323 | " | " | 16.99 |
| b | 172124 | ethylene terephthalate copolymers prepared with di($\beta$-hydroxyethyl)-5,5-dimethylhydantoin | None | 5.66 |
| c | 172123 | " | " | 11.42 |
| d | 172122 | " | " | 17.32 |
| e | 172140 | ethylene terephthalate copolymers prepared with alkoxy poly(oxyalkylene) glycol chain terminator and chain-branching agent | $CH_3(CH_2)_{12.5}O(CH_2CH_2O)_{13.5}H$ pentaerythritol | 5.0 0.125 |
| p | PO120 | " | " | " |
| s | CP286 | " | " | |
| f | 172186 | " | $CH_3(CH_2)_{12.5}O(CH_2CH_2O)_{13.5}H$ azelaic acid pentaerythritol | 3.0 2.1 0.075 |
| o | PO62F | " | $CH_3(CH_2)_{12.5}O(CH_2CH_2O)_{13.5}H$ azelaic acid pentaerythritol | 2.5 3.5 0.063 |
| i | 175249 | homopolyester of terephthalic acid and 1,3poly(ethoxylated)-5,5 dimethylhydantoin diol | x+y=10 | — |
| j | 180315 | homopolyester of azelaic acid and 1,3-poly(ethoxylated)-5,5-dimethyl-hydantoin diol | x+y=10 | — |
| v | 98457 | homopolyester of 1,3-di(carboxyethyl)-5,5-dimethylhydantoin and 1,3-di(2-hydroxyethyl)-5,5-dimethylhydantoin | — | — |
| O | 180311 | poly(ethylene terephthalate) with addition of second homopolyester | Composition i | 6.3 |
| P | 180316 | " | Composition j | 7.2 |
| w | 172115 | " | Composition v | 7.7 |
| k | 180334 | butylene terephthalate copolymer prepared with 1,3-poly(ethoxylated) 5,5-dimethylhydantoin | x+y=10 | 4.4 |

TABLE II

POLYMER AND FIBER PROPERTIES

| Composition | Run No. | Draw Ratio | Melting Point (°C) | $\eta_{sp}$ | Weight % Nitrogen | Tenacity (gram/denier) | Elongation (%) | Modulus (gram/denier) | Denier |
|---|---|---|---|---|---|---|---|---|---|
| A | 172135 | 5.0 | 253 | 0.301 | None | 4.3 | 31.0 | 156 | 59 |
| t | CP289 | 4.5 | 257 | 0.357 | None | 4.2 | 28.4 | 72 | 168 |
| B* | 172134 | 5.0 | 245 | 0.354 | 0.35 | 4.6 | 29.4 | 139 | 43 |
| C* | 172132 | 5.0 | 243 | 0.385 | 0.47 | 5.3 | 23.3 | 132 | 31 |
| D | 172107 | 3.7 | 236 | 0.272 | 0.74 | 3.3 | 78.9 | 64 | 33 |
| 1** | PO101A | 1.7 | 244 | 0.345 | n.d. | 3.9 | 30.9 | n.d. | 160 |
| E* | 172131 | 5.0 | 251 | 0.315 | 0.09 | 4.6 | 30.0 | 149 | 51 |
| F* | 172130 | 5.0 | 251 | 0.364 | 0.13 | 5.1 | 22.8 | 150 | 36 |
| G* | 172125 | 5.0 | 251 | 0.322 | 0.23 | 4.1 | 35.4 | 123 | 59 |
| H | 172188 | 5.0 | 250 | 0.338 | 0.19 | 4.1 | 33.6 | 140 | 78 |
| I* | 172108 | 4.5 | 244 | 0.335 | 0.50 | 3.4 | 55.8 | 86 | 59 |
| J | 175267 | 5.0 | 237 | 0.395 | 0.79 | 4.2 | 35.3 | 101 | 41 |
| R* | 175187 | 5.0 | 246 | 0.365 | 0.24 | 4.5 | 32.2 | 149 | 55 |
| m** | PO73A | 1.8 | 246 | 0.372 | 0.24 | 4.0 | 31.4 | n.d. | 160 |
| q** | CP287 | 4.5 | 253 | 0.388 | n.d. | 4.1 | 35.7 | 62 | 173 |
| K* | 175243 | 5.0 | 249 | 0.342 | 0.11 | 4.6 | 18.9 | 134 | 41 |
| u* | 180327 | 5.0 | 253 | 0.325 | 0.17 | 4.2 | 22.7 | 127 | 63 |
| L | 175266 | 4.0 | 251 | 0.390 | 0.25 | 3.9 | 53.7 | 89 | 36 |
| M* | 175242 | 5.0 | 246 | 0.371 | 0.28 | 4.5 | 29.7 | 121 | 45 |
| Q* | 180340 | 5.0 | 251 | 0.353 | 0.17 | 4.4 | 27.0 | 137 | 54 |
| n** | PO112A | 1.8 | 248 | 0.238 | n.d. | 3.9 | 28.3 | n.d. | 160 |
| N* | 180301 | 5.0 | 255 | 0.322 | 0.15 | 3.9 | 27.4 | 125 | 63 |
| S* | 175289 | 5.0 | 248 | 0.341 | None | 4.4 | 29.9 | 134 | 67 |
| T* | 175295 | 5.0 | 254 | 0.342 | None | 4.3 | 27.4 | 133 | 61 |
| U* | 175285 | 5.0 | 252 | 0.319 | None | 4.2 | 28.1 | 121 | 74 |
| V | 175296 | 5.0 | 252 | 0.356 | None | 4.1 | 26.1 | 130 | 69 |
| W* | 175293 | 5.0 | 251 | 0.352 | None | 4.0 | 30.6 | 114 | 55 |
| r** | CP290 | 4.6 | 253 | 0.346 | None | 3.9 | 31.6 | 52 | 170 |
| X* | 175292 | 5.0 | 253 | 0.326 | None | 4.6 | 26.2 | 132 | 41 |
| Y | 180303 | 4.5 | 247 | 0.329 | n.d. | 4.2 | 36.2 | 128 | 44 |
| Z | 180322 | 5.0 | 239 | 0.231 | 1.58 | 3.9 | 29.2 | 125 | 76 |
| a | 180323 | 5.0 | 229 | 0.216 | 2.38 | 3.7 | 25.6 | 102 | 94 |
| b | 172124 | 5.0 | 240 | 0.262 | 0.95 | 3.7 | 33.0 | 114 | 58 |
| c | 172123 | 5.0 | 229 | 0.345 | 1.46 | 3.9 | 18.4 | 117 | 38 |
| d | 172122 | 5.0 | 213 | 0.319 | 2.07 | 3.5 | 26.6 | 106 | 51 |
| e* | 172140 | 5.0 | 250 | 0.299 | None | 4.2 | 20.6 | 172 | 72 |
| p** | PO120 | 4.0 | 252 | 0.361 | None | n.d. | n.d. | n.d. | n.d. |
| s** | CP286 | 4.0 | 253 | 0.357 | None | 3.1 | 23.9 | 66 | 188 |
| f** | 172186 | 5.0 | 244 | 0.337 | None | 4.4 | 26.6 | 152 | 60 |
| o** | PO62F | 2.0 | n.d. | 0.371 | None | 3.2 | 31.0 | n.d. | 145 |
| i*** | 175249 | n.s. | n.d. | 0.411 | n.d. | n.s. | n.s. | n.s. | n.s. |
| j**** | 180315 | n.s. | n.d. | 0.158 | n.d. | n.s. | n.s. | n.s. | n.s. |
| v | 98457 | n.s. | n.d. | 0.134 | n.d. | n.s. | n.s. | n.s. | n.s. |

TABLE II-continued

| | | | POLYMER AND FIBER PROPERTIES | | | | | | |
|---|---|---|---|---|---|---|---|---|---|
| | | | Melting | | | Tensile Properties of Fibers | | | |
| Composition | Run No. | Draw Ratio | Point (° C) | $\eta_{sp}$ | Weight % Nitrogen | Tenacity (gram/denier) | Elongation (%) | Modulus (gram/denier) | Denier |
| O | 180311 | 5.0 | 256 | 0.298 | 0.30 | 3.8 | 33.3 | 118 | 96 |
| P | 180316 | 5.0 | 255 | 0.223 | 0.39 | 2.4 | 28.4 | 81 | 211 |
| w | 172115 | 5.0 | 253 | 0.264 | 1.04 | 2.9 | 6.1 | 130 | 104 |
| k | 180334 | 5.0 | 218 | 0.399 | 0.16 | 3.1 | 35.7 | 33 | 174 | n.d. = Not determined
n.s. = Not spinnable
\* 134 ppm
\*\* 100 ppm
\*\*\* 220 ppm
\*\*\*\*536 ppm
Amount of a rubber antioxidant, supplied by Monsanto Company under the trademark, "Santowhite Powder," added to the polymer.

The following specific examples illustrate the manner of preparation of the compositions and fibers listed in Tables I and II, respectively.

EXAMPLE 1., preparation of composition A.

This example is an unmodified polyethylene terephthalate fiber prepared in the following manner:

A polyethylene terephthalate prepolymer containing no additives other than 234 ppm of antimony as a polycondensation catalyst was utilized. This prepolymer had a specific viscosity of 0.168 measured at 2.0g of prepolymer per deciliter of phenol/tetrachloroethane (60/40) at 25° C., contained 616 $\mu$eq/g of carboxyl groups, contained 1.43 mole % diethylene glycol based upon terephthalate content and had an ethylene glycol to terephthalic acid ratio of 1.33.

Two hundred grams of the above polyethylene terephthalate prepolymer was placed in a 900 ml stainless steel autoclave that had been purged by nitrogen and heated to 265° C. at approximately 8° C./min. At 265° C., the autoclave was evacuated at 1.0 mm Hg pressure or less and the polycondensation was continued with stirring until the specific viscosity of the polymer in phenol/tetrachloroethane (60/40) at 25° C. and 0.5 g/dl reached 0.3 to 0.4. The molten polymer is then extruded at 275° C. through a spinnerette having 10 holes, each of 13 mil diameter, into a water quench bath and then packaged after application of a spin finish. The filament bundle was then drawn at a feed speed of 80 ft/min. (244 m/min.) over a heated pin at 80° C. with a draw ratio of 5. The continuous filament bundle was thereafter knit into fabric on a Lawson Fiber Analysis Knitter with a 70 gauge head and 36 inches (89 cm.) per course.

EXAMPLE 2., preparation of compositions B, C, D, E, F, G, H, I, J, L, M, N and u.

The purpose of this example is to prepare compositions of this invention. Ethylene Terephthalate copolymers incorporating polyalkoxylated hydantoin derivatives, namely poly(ethoxylated) dimethyhydantoins were prepared by forming a copolymer from a mixture of polyethylene terephthalate prepolymer and hydantoin diol by copolymerizing the mixture according to the conditions described in Example 1 above. The hydantoin modifier corresponds to Formula V.

Table III set forth below shows the $x+y$ relationship, the concentration of reactants and the mole percent and weight percent of the polyalkoxylated hydantoin terephthalate repeat unit.

TABLE III

| | | Reactants | | | |
|---|---|---|---|---|---|
| Composition | $x+y$ | Prepolymer Grams | Hydantoin-Diol Grams | Mole % | Weight % |
| B | 5 | 190 | 10 | 2.59 | 7.28 |
| C | 5 | 185 | 15 | 4.00 | 10.93 |
| D | 5 | 180 | 20 | 5.47 | 14.58 |
| E | 10 | 197 | 3 | 0.50 | 2.00 |
| F | 10 | 194 | 6 | 1.01 | 4.02 |
| G | 10 | 190 | 10 | 1.72 | 6.70 |
| H | 10 | 190 | 10 | 1.72 | 6.70 |
| I | 10 | 180 | 20 | 3.64 | 13.39 |
| J | 10 | 170 | 30 | 5.78 | 20.08 |
| K | 15 | 194 | 6 | 0.76 | 3.85 |
| u | 15 | 190 | 10 | 1.29 | 6.41 |
| L | 15 | 185 | 15 | 1.99 | 9.61 |
| M | 15 | 185 | 15 | 1.99 | 9.61 |
| N | 20 | 190 | 10 | 1.03 | 6.24 |

The mole percent and weight percent appearing in this table is the percent of structural unit II shown in Formula III based upon the calculated copolymer weight.

EXAMPLE 3., preparation of compositions Q, R.

The purpose of this example is to show that copolymers of this invention may be prepared by direct esterification reaction. In Example 2 esterification is by copolymerization wherein the polyalkoxylated hydantoin derivative is reacted with a polyethylene terephthalate prepolymer to form the copolymer of this invention. Copolymers illustrating this invention can also be prepared by ester interchange between dimethyl terephthalate and a dihydric diol and a hydantoin diol.

Copolyesters of ethylene terephthalate were prepared by esterification of the diacid components and the diol components. The following esterification components were charged to a stainless steel autoclave and the autoclave was purged with nitrogen:

| Constituents used to prepare: Composition Q | Constituents used to prepare: Composition R |
|---|---|
| 166 gram terephthalic acid | 166 gram terephthalic acid |
| 75 gram ethylene glycol | 75 gram ethylene glycol |
| 10 gram hydantoin-diol | 10 gram hydantoin-diol |
| (x+y=15) | (x+y=15) |
| 0.1 gram catalyst | 0.1 gram catalyst |
| 0.1 gram lithium acetate . | 0.1 gram lithium acetate . |
| 4H$_2$O | 4H$_2$O |
| 0.024 gram antioxidant | 0.024 gram antioxidant |

As used herein the catalyst and the antioxidant referred to in the examples are: catalyst, a compound having the following formula: 2,2-ethylene dioxbis [1,3,2-dioxastibolane] and antixoidant, a product supplied by Monsanto Company under the trademark, "Santowhite Powder."

The reactants were heated to 240° to 250° C. under 110 p.s.i. (77.8 kg/cm²) pressure over 45 minute period with stirring. The pressure was reduced to atmospheric pressure over 75 minute period while the temperature was increased to 270° to 280° C. The polymerization was then continued at reduced pressure of less than 1 mm Hg for approximately 60 min. Fibers were then spun and drawn as described in Example 1.

Table IV set forth below shows the $x+y$ relationship and the mole percent and weight percent of the hydantoin modifiers incorporated into compositions Q and R. These modifiers have the structure shown as Formula V.

TABLE IV

| Composition | x+y | Mole % | Weight % |
|---|---|---|---|
| Q | 15 | 1.14 | 5.70 |
| R | 10 | 1.52 | 5.95 |

The mole percent and weight percent appearing in this table is the percent of structural unit II shown in Formula III.

EXAMPLE 4., preparation of compositions S, T, U, V, W, and X.

This example illustrates the preparation of polymers containing a polyethylene glycol modifier such as disclosed in U.S. Pat. No. 2,744,087. Ethylene terephthalate copolymers containing poly(ethoxy) diols were prepared by copolymerizing the poly(ethoxy) diol and poly(ethylene terephthalate) prepolymer in an autoclave under the conditions as described in Example 1.

Table V set forth below shows the concentration of the reactants and mole percent and weight percent of the poly(ethoxy) terephthalate repeat unit.

TABLE V

| Composition | Average Molecular Weight of Poly(ethylene oxide) Diol | | Reactants | | Mole % | Weight % |
|---|---|---|---|---|---|---|
| | | | Prepolymer (grams) | Poly(ethoxy) Diol (grams) | | |
| S | 395.6 | (a) | 190 | 10 | 2.86 | 7.46 |
| T | 600 | (b) | 194 | 6 | 1.11 | 4.08 |
| U | 600 | (b) | 190 | 10 | 1.89 | 6.81 |
| V | 600 | (b) | 190 | 10 | 1.89 | 6.81 |
| W | 600 | (b) | 185 | 15 | 2.91 | 10.21 |
| X | 1,000 | (c) | 190 | 10 | 1.13 | 6.31 |

The terms mole percent and weight percent appearing in this table are the percents of the structural unit derived from terephthalic acid and poly (ethylene oxide) diol.

(a) A polymer purchased from Union Carbide under the trademark "Carbowax Polyethylene Glycol 400"

(b) A polymer purchased from Union Carbide under the trademark "Carbowax Polyethylene Glycol 600"

(c) A polymer purchased from Union Carbide under the trademark "Carbowax Polyethylene Glycol 1000"

EXAMPLE 5., preparation of compositions Y, Z, a.

This example illustrates the preparation of polymers containing hydantoin derivatives such as disclosed in U.S. Pat. No. 3,856,754. Copolyesters of ethylene terephthalate and 1,1'-methylene-bis-[3-(β-hydroxylethyl)-5,5-dimethylhydantoin] were prepared by copolymerizing the hydantoin-diol and poly(ethylene terephthalate) prepolymer in an autoclave in a manner described in Example 1.

Table VI set forth below shows the concentration of the reactants and the mole percent and weight percent of the 1,1'-methylene-bis[3-β-oxyethyl)-5,5-dimethylhydantoin] terephthalate repeat unit.

TABLE VI

| Composition | Reactants | | Mole % | Weight % |
|---|---|---|---|---|
| | Prepolymer (grams) | Hydantoin Diol (grams) | | |
| Y | 190 | 10 | 3.18 | 7.67 |
| Z | 180 | 20 | 6.70 | 15.39 |
| a | 170 | 30 | 10.65 | 23.19 |

The mole percent and weight percent appearing in this table is the percent of the structural unit derived from terephthalic acid and the hydantoin diol.

EXAMPLE 6., preparation of compositions b, c, d.

This example illustrates the preparation of copolymers that contain the simplest member of the ethoxylated hydantoin series added to the polymer chain.

Copolyesters of ethylene terephthalate and di(β-oxyethyl)-5,5-dimethylhydantoin terephthalate were prepared by copolymerizing the hydantoin-diol and poly(ethylene terephthalate) prepolymer in an autoclave according to the conditions described in Example 1.

These copolymers contain the simplest member of the ethoxylated hydantoin series having the following formula:

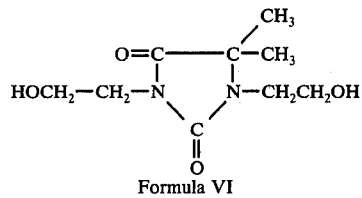

Formula VI

Table VII set below shows the concentration of the reactants and the mole percent and weight percent of the di(β-oxyethyl)-5,5-dimethylhydantoin terephthalate repeat unit.

TABLE VII

| Composition | Reactants | | Mole % | Weight % |
|---|---|---|---|---|
| | Prepolymer (grams) | Hydantoin Diol (grams) | | |
| b | 190 | 10 | 5.24 | 9.06 |
| c | 180 | 20 | 11.05 | 18.29 |
| d | 170 | 30 | 17.56 | 27.74 |

The mole percent and weight percent appearing in this table is the percent of the structural unit derived from terephthalic acid and the hydantoin diol.

EXAMPLE 7., preparation of compositions e, f.

This example illustrates the preparation of polymers that contain chain-terminating and chain-branching agents such as disclosed in U.S. Pat. Nos. 2,895,946 and 2,905,657. Fibers having composition e were prepared by polymerization of a polymer as described in Example 1., and fibers having composition f were polymerized in a manner described in Example 3. These two copolyesters were then spun from a laboratory autoclave in a manner described in Example 1. The following quantities of reactants were copolymerized.

| Constituents used to prepare: Composition e | Constituents used to prepare: Composition f |
|---|---|
| 164 gram terephthalic acid | 162.5 gram terephthalic acid |
| 366 gram ethylene glycol | 4.2 gram azelaic acid |
| 0.1 gram catalyst | 75 gram ethylene glycol |
| 0.045 gram manganous acetate . $4H_2O$ | 0.1 gram catalyst |
| 0.45 gram optical brightener | 0.024 gram antioxidant |
| 0.02 gram antioxidant | 6.0 gram H—(—$OCH_2CH_2$)$_{13.5}$—O—($CH_2$)$_{12.5}$—$CH_3$ |
| 0.05 gram lithium carbonate | 0.150 gram pentaerythritol |
| 0.25 gram pentaerythritol | 3 drops triphenylphosphite |
| 10.0 gram $CH_3$—($CH_2$)$_{12.5}$—O—($CH_2CH_2O$)$_{13.5}$H | 0.045 gram manganous acetate . $4H_2O$ |
| 3 drops triphenylphosphite | |

As used herein the optical brightener additive referred to in the examples is a product supplied by the Sandoz Company known as Product No. —6305.

EXAMPLE 8., preparation of composition i.

This example illustrates the preparation of a homopolyester prepared from terephthalic acid and a polyalkoxylated hydantoin diol. This is a composition wherein the weight percent of structural unit II in Formula III is 100%.

The following reactants were charged to a stainless steel autoclave:
150 gram of polyethoxylated-dimethyl-hydantoin $(x+y=10)$
40 gram of terephthalic acid
0.1 gram catalyst
0.1 gram of lithium acetate .$4H_2O$
0.04 gram antioxidant The autoclave was purged with nitrogen. The reactants were heated to 265° C and a pressure of 105 pounds per square inch (73.5 kg/cm²) over a 95 minute period with stirring. The pressure was reduced to atmospheric over a 25 minute interval. The polymerization was then continued at reduced pressure of less than 1 mm Hg for 160 minutes at 265° C. This composition has the following formula:

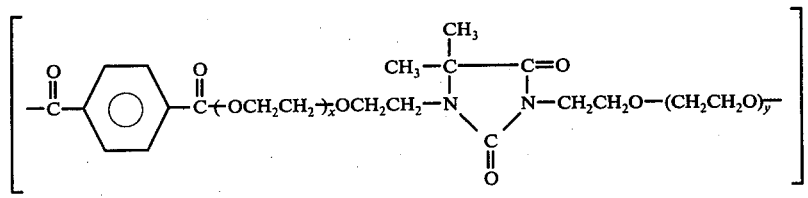

where x + y = 10
Formula VII

EXAMPLE 9., preparation of composition j.

This example illustrates the preparation of a homopolyester of polyalkoxylated hydantoin diol and an aliphatic acid, e.g., azelaic acid as reactants. This is a composition wherein "A" in Formula I is not an aromatic radical. In this composition the weight percent of structural unit II in Formula III is 100%.

The following reactants were charged to a stainless steel autoclave:
150 gram of polyethoxylated-dimethyl-hydantoin $(x+y=10)$
45.17 gram azelaic acid
0.05 gram catalyst
0.10 gram antioxidant The autoclave was purged with nitrogen. The reactant were heated to 220° C. and 65 pounds per square inch (46 kg/cm²) pressure over a 60 minute interval with stirring. The pressure was reduced to atmospheric over a 45 minute interval. The polymerization was then continued at reduced pressure less than 1 mm Hg for 215 minutes at 225° C. This homopolyester was prepared by the direct esterification of the polyalkoxylated hydantoin derivative having the structure shown in Formula V and azelaic acid. This composition has the following formula:

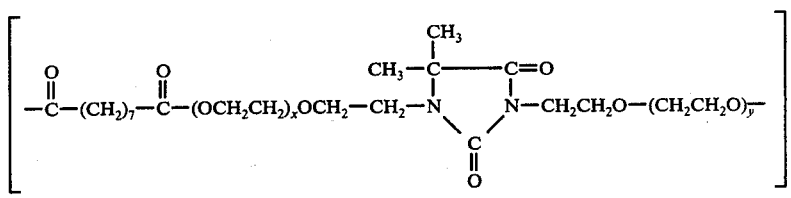

where x + y = 10
Formula VIII

Compositions i and j illustrate the preparation of polymers that are composed entirely of structural Unit II. These polymers can then be added to Unit I to form a blend or a block copolymer of the two structural units.

EXAMPLE 10., preparation of composition k.

This composition illustrates the preparation of a copolymer having a structure shown in Formula I where "G" is a unit other than ethylene.

A copolyester of butylene terephthalate and polyethoxylated hydantoin terephthalate was prepared. A stainless steel autoclave was charged with the following reactants:
- 194 gram dimethyl terephthalate
- 270 gram butane diol
- 10 gram of the hydantoin derivative having Formula V, (x+y=10)
- 0.10 gram manganous acetate .4H$_2$O
- 0.17 gram tetrabutyl orthotitinate
- 0.03 gram antioxidant The reactants were heated to 170° to 180° C., and methanol distillate was collected for 75 minutes. The temperature was increased to 248° C. over 120 minute interval and maintained at 248° C. for 30 minutes while distillate was collected. The polymerization was continued at 248° C. and a pressure of less than 1 mm Hg for 30 minutes.

EXAMPLE 11., preparation of compositions l, m, n.

This example illustrates continuous polymerization of formulae having different mole ratios. The invention described herein can be practiced in both continuous and batch modes.

Polyethylene terephthalate copolymers were prepared in a laboratory scale continuous polymerization unit. A slurry of ingredients is continuously fed to a stirred reactor operated at 20 psig (14 kg/cm$^2$) and 270° C. The slurry feed to this polymerization system consists principally of terephthalic acid and ethylene glycol in a ½ molar ratio. The compositions of these copolymers are given in Table VIII as weight percentages based upon the theoretical polymer weight. After an average dwell time of 2 hours the mixture is metered to a 7-tray bubble cap column, passing downward at 280° C. against a countercurrent flow of 7500 cm/min of dry nitrogen. The resulting low molecular weight polymer is metered to a horizontal tubular reactor stirred by a cage type agitator. The average dwell time in this final reactor is approximately 2 hours, temperatures and/or pressures are adjusted to give a final polymer specific viscosity between 0.3 and 0.4. Temperatures are commonly 275°-290° C., pressures commonly 1-10 mm Hg. Water and glycol are removed continuously from all stages of the polymerization.

Feed rates are adjusted throughout to yield around 5.0 lbs./hr. of copolymer. The molten polymer is extruded in a strand, quenched in water and cut into pellets. The pellets are dried under heat and vacuum to a moisture content of less than 0.005%.

These compositions have the following formula:

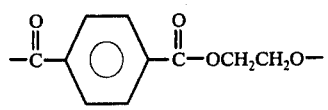
(I)

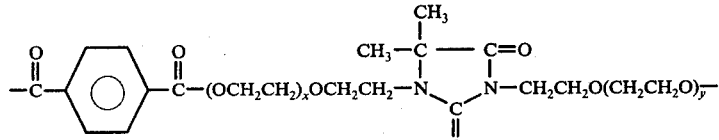
(II)

Formula IX wherein Units I, II, x and y are as follows:

TABLE VIII

| Composition | % Unit I | % Unit II | x+y |
|---|---|---|---|
| l | 93.79 | 6.21 | 5 |
| m | 94.27 | 5.73 | 10 |
| n | 94.51 | 5.49 | 15 |

Terephthalic acid, ethylene glycol and polyethoxylated-hydantoin diol were reacted together with the following additives and modifiers producing the above compositions:

| Composition 1 - | catalyst | 493 ppm |
|---|---|---|
| | antioxidant | 100 ppm |
| | titanium dioxide | 2,593 ppm |
| | triphenyl phosphite | 292 ppm |
| | anti-foam | 91 ppm |
| Composition m - | catalyst | 496 ppm |
| | antioxidant | 100 ppm |
| | titanium dioxide | 2,678 ppm |
| | triphenyl phosphite | 291 ppm |
| | anti-foam | 91 ppm |
| | manganous acetate . 4H$_2$O | 227 ppm |
| | lithium carbonate | 75 ppm |
| Composition n - | catalyst | 491 ppm |
| | antioxidant | 100 ppm |
| | titanium dioxide | 2,584 ppm |
| | triphenyl phosphite | 291 ppm |
| | anti-foam | 91 ppm |

As used herein the anti-foam additive referred to in the examples is a product supplied by the Dow Corning Company and identified as, "antifoam y-30 emulsion."

EXAMPLE 12., composition o.

This example and example 13 illustrate the preparation of copolymers of this prior art that contain chain-terminating and chain-branching agents.

Polyethylene terephthalate was modified by the addition of the following additives and modifiers:

| pentaerythritol | 625 ppm |
|---|---|
| manganous acetate . 4H$_2$O | 225 ppm |
| antioxidant | 100 ppm |
| titanium dioxide | 2900 ppm |

This modified composition has the following formula:

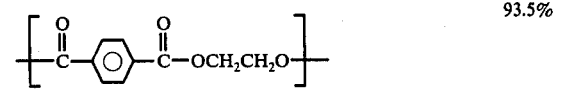
93.5%

-continued

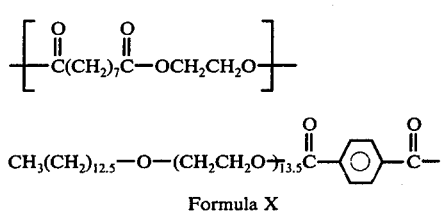

Formula X

EXAMPLE 13., composition p.

Polyethylene terephthalate was modified by the addition of the following additives and modifiers:

| | |
|---|---|
| pentaerythritol | 1257 ppm |
| catalyst | 490 ppm |
| titanium dioxide | 3014 ppm |
| lithium carbonate | 81 ppm |
| antioxidant | 100 ppm |
| anti-foam | 91 ppm |
| triphenyl phosphite | 295 ppm |

This modified composition has the following formula:

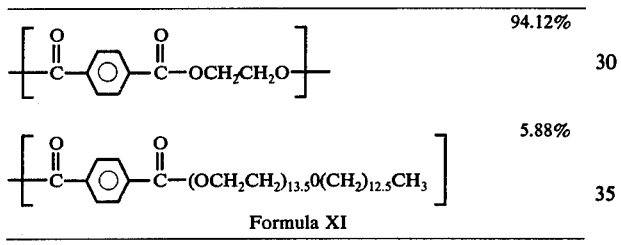

Formula XI

EXAMPLE 14., compositions q, r, s, t.

These compositions were polymerized in the manner described in Example 10. The purpose of this example is to obtain a comparison of fibers of different compositions prepared under another set of conditions.

Composition q is a composition of this invention and the following reactants were used:

| | |
|---|---|
| catalyst | 496 ppm |
| titanium dioxide | 2678 ppm |
| triphenyl phosphite | 291 ppm |
| brightener | 228 ppm |
| antioxidant | 100 ppm |
| anti-foam | 91 ppm |

This composition has Formula IX, wherein the weight percent of structural unit I is 94.27%, the weight percent of structural unit II is 5.73% and $x+y=10$.

Composition r is another composition of the prior art such as disclosed in U.S. Pat. No. 2,744,087 and the following reactants were used:

| | |
|---|---|
| catalyst | 496 ppm |
| titanium dioxide | 2678 ppm |
| triphenyl phosphite | 291 ppm |
| brightener | 228 ppm |
| antioxidant | 100 ppm |
| anti-foam | 91 ppm |

This composition has the following formula:

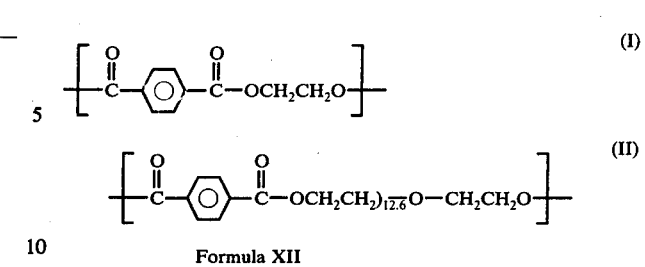

Formula XII wherein the weight percent of structural unit I is 94.10% and the weight percent of structural unit II is 5.82%.

Composition s is another composition of the prior art that contains chain-branching and chain-terminating agents and the following reactants were used:

| | |
|---|---|
| pentaerythritol | 1262 ppm |
| catalyst | 490 ppm |
| titanium dioxide | 2578 ppm |
| triphenyl phosphite | 295 ppm |
| brightener | 226 ppm |
| antioxidant | 100 ppm |
| anti-foam | 91 ppm |
| lithium carbonate | 75 ppm |
| manganous acetate . 4H$_2$O | 228 ppm |

This composition has the following formula:

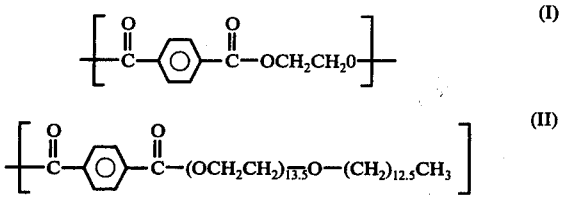

Formula XIII wherein the weight percent of structural unit I is 94.12% and the weight percent of structural unit II is 5.88%.

Composition t is unmodified polyethylene terephthalate wherein the following reactants were used:

| | |
|---|---|
| catalyst | 514 ppm |
| titanium dioxide | 2704 ppm |
| triphenyl phosphite | 309 ppm |
| brightener | 238 ppm |

EXAMPLE 15., preparation of compositions O and P.

This example illustrates the preparation of block copolymers and blends. The purpose of this example is to show that the beneficial effect of the polyalkoxylated hydantoin derivative can be obtained by modifying polyethylene terephthalate by means other than random copolymerization.

Each of these compositions was prepared by first preparing two separate batches of 200 grams of polyethylene terephthalate prepolymer in a manner described in Example 1. When the specific viscosity reached 0.35 to 0.40, approximately 12 grams of composition i, previously described in Example 8, was added to the first batch, and 14 grams of composition j, previously described in Example 9, was added to the second. New compositions O and P were respectively formed and the resultant polyesters were stirred at 250°–255° C for 5 minutes. Fibers were then spun from the autoclave.

The following examples set forth test results obtained from tests performed on the compositions in Table I and prepared in Examples 1 to 15. The details of the test procedures are described hereinabove.

EXAMPLE 16., Oxidative Thermal Stability.

The oxidative thermal stability of fibers prepared from different compositions are shown in Table IX set forth below. This property was measured in the manner previously described herein heating samples in a forced air oven at 180° C.

EXAMPLE 17., Oxidative Thermal Stability.

The effect of the $x+y$ component on this important property was evaluated. Compositions containing 5 to 6 weight percent modifier having varying degrees of ethoxylation were examined by heating fibers for 5 minutes at a series of temperatures in a forced air oven. The specific viscosities of the fibers were determined prior to and after heating. The temperature intervals at which precipitous losses in specific viscosity occurred are indicative of the threshold temperature for thermal oxidative degradation of the fiber. The results of this test are set forth below in Table X.

TABLE IX

| Compo-sition | Co-reactant | Weight Percent Co-reactant based upon polymer wt. | Specific Viscosity, $n_{sp}$ | | |
|---|---|---|---|---|---|
| | | | Prior to Heating | Heated 5 mins. | Heated 15 mins. |
| A | None | None | 0.300 | 0.293 | 0.300 |
| B | Hydantoin derivative, $x + y = 5$ | 5.61 | 0.350 | 0.351 | 0.351 |
| C | Hydantoin derivative, $x + y = 5$ | 8.42 | 0.376 | 0.373 | 0.372 |
| F | Hydantoin derivative, $x + y = 10$ | 3.36 | 0.353 | 0.353 | 0.361 |
| G | " | 5.59 | 0.329 | 0.317 | 0.328 |
| H | " | 5.59 | 0.319 | 0.324 | 0.322 |
| R | " | 4.97 | 0.345 | 0.346 | 0.342 |
| M | Hydantoin derivative, $x + y = 15$ | 8.37 | 0.358 | 0.307 | 0.172 |
| L | " | 8.37 | 0.384 | 0.300 | 0.180 |
| Q | " | 4.96 | 0.334 | 0.331 | 0.300 |
| u | " | 5.58 | 0.333 | 0.332 | 0.325 |
| N | Hydantoin derivative, $x + y = 20$ | 5.58 | 0.322 | 0.312 | 0.301 |
| S | Poly(ethoxy)diol mol wt = 400 | 5.61 | 0.336 | 0.275 | 0.266 |
| T | Poly(ethoxy)diol mol wt = 600 | 3.36 | 0.325 | 0.241 | 0.136 |
| U | " | 5.60 | 0.331 | 0.306 | 0.230 |
| V | " | 5.60 | 0.339 | 0.313 | 0.201 |
| W | " | 8.39 | 0.338 | 0.255 | 0.151 |
| X | Poly(ethoxy)diol mol wt = 1000 | 5.58 | 0.331 | 0.317 | 0.216 |
| e | $CH_3(CH_2)_{12.5}—O—(CH_2CH_2O)_{13.5}H$ | 5.0 | 0.298 | 0.251 | 0.235 |
| f | $CH_3(CH_2)_{12.5}—O—(CH_2CH_2O)_{13.5}H$ $HOOC(CH_2)_7COOH$ | 3.0 2.1 | 0.317 | 0.243 | 0.226 |

TABLE X

| Comp. | Wt. Percent Co-reactant Based Upon Polymer Weight | $x + y$ | Specific Viscosity | | | | | | Temp. Interval of Onset of Degradation |
|---|---|---|---|---|---|---|---|---|---|
| | | | Prior to Heating | 180° C | 190° C | 200° C | 210° C | 220° C | |
| B | 5.61 | 5 | 0.344 | 0.351 | 0.348 | 0.335 | 0.224 | 0.161 | 200–210° C |
| H | 5.59 | 10 | 0.312 | 0.324 | 0.305 | 0.214 | 0.164 | 0.152 | 190–200° C |
| G | 5.59 | 10 | 0.325 | 0.317 | 0.312 | 0.237 | 0.163 | 0.151 | 190–200° C |
| u | 5.58 | 15 | 0.333 | 0.332 | 0.303 | 0.196 | 0.169 | 0.137 | 190–200° C |
| N | 5.58 | 20 | 0.322 | 0.312 | 0.256 | 0.193 | 0.165 | 0.159 | 180–290° C |

The results shown in this table indicate that the compositions modified with the polyalkoxylated hydantoin derivative are saliently more stable to thermal oxidation than compositions S, T, U, V, W, X, e and f all of which are known prior art compositions. Decreasing specific viscosities of the fiber during heating is indicative that oxidative degradation has occurred and resulted in decreasing molecular weight.

It can be seen from these results that the temperature interval for the onset of thermal oxidative degradation decreases as the sum of $x+y$ increases.

The amount of the modifier, or weight percent of hydantoin derivative, present in the polymer was also evaluated in a manner as described above to determine its effect on this important property. The results of this evaluation are set forth below in Table XI.

TABLE XI

| Comp. | Wt. % Hydantoin Co-reactant Based Upon Polymer Wt. | Wt. % Hydantoin terephthalate Repeat Unit | Prior to Heating | Specific Viscosity | | | | | | | | Temp. Interval on Onset of Degradation |
|---|---|---|---|---|---|---|---|---|---|---|---|---|
| | | | | 130° C | 140° C | 150° C | 160° C | 170° C | 180° C | 190° C | 200° C | |
| G | 5.59 | 6.70 | .325 | — | — | — | — | — | .317 | .312 | .237 | 190–200° C |
| 180332 | 8.39 | 10.05 | .323 | — | — | — | .323 | .321 | .318 | .287 | .172 | 180–190° C |
| 180333 | 11.18 | 13.39 | .339 | — | — | — | .336 | .324 | .256 | .142 | .118 | 170–180° C |

TABLE XI-continued

| Comp. | Wt. % Hydantoin Co-reactant Based Upon Polymer Wt. | Wt. % Hydantoin terephthalate Repeat Unit | Prior to Heating | Specific Viscosity | | | | | | | | Temp. Interval on Onset of Degradation |
|---|---|---|---|---|---|---|---|---|---|---|---|---|
| | | | | 130° C | 140° C | 150° C | 160° C | 170° C | 180° C | 190° C | 200° C | |
| J | 16.76 | 20.08 | .395 | .396 | .393 | .383 | .311 | .219 | — | — | — | 150–160° C |

From these results it is apparent that optimum improvement in oxidative thermal stability is achieved when the polymer contains less than about 10% by weight of the hydantoin repeat unit based upon the polymer weight.

Composition 180332 and Composition 180333 do not appear in Tables I and II.

EXAMPLE 18., Thermal Stability.

Another measure of this important property is that temperature at which the initial weight loss of the fiber begins. This property was measured by thermal gravimetric analysis in a manner previously described herein. Table XII set forth below shows the thermal stability of various compositions described herein.

TABLE XII

| Composition | Temperature on Onset of Weight Loss, ° C | |
|---|---|---|
| | In Air | In Nitrogen |
| C | 255 | 335 |
| G | 224 | 375 |
| H | 230 | 365 |
| R | 210 | 360 |
| N | 200 | 305 |
| S | 195 | 295 |
| U | 185 | 280 |
| V | 150 | 240 |
| X | 190 | 290 |
| e | 195 | 360 |
| f | 185 | 355 |

The results shown in this table show that the compositions of this invention have considerably higher threshold temperatures of oxidation than the modified compositions of the prior art. Also those compositions containing 1,3-poly(ethoxylated)-5,5-dimethylhydantoin exhibit higher threshold temperatures of thermal decomposition in the inert atmosphere of nitrogen than those compositions containing poly(ethoxy) diols. This improvement in thermal stability is advantageous in the melt processing of the compositions of this invention.

EXAMPLE 19., Evaluation of Dye Depth.

Knit tubing of the fibers described in previous examples was scoured using a 40:1 liquor to fabric ratio in an aqueous scour bath containing 2 g/l of Varsol, 1 g/l of Igepal CO-630 and 0.5 g/l of sodium hydroxide. Tubing was scoured for 20 min. at 93° C. and rinsed in hot tap water. The tubing was then rinsed in an aqeuous bath containing 0.5 g/l of acetic acid with 40:1 liquor to fabric ratio for 10 min. at 43° C. The fabric was rinsed in hot tap water and dried at 60° C. The fabrics were dyed in capped glass tubes tumbled in an oil bath maintained at 100° C. for 80 min. The aqueous dyebath contained 4.0% owf a brilliant blue standard commercial dye and 8.0% owf Igepon T-Igepon"purchased from GAF Corporation under the trademark "lgepon" and dyeings were conducted at 40:1 liquor to fabric ratio. Dyed fabrics were scoured for 15 min. at 60° C. at 40:1 liquor to fabric ratio in an aqeuous solution containing 0.5% owf of Igepal CP-710 and 0.5% owf trisodium phosphate. The dyed fabrics were then rinsed in hot tap water and dried at 60° C. The dye depth of tubings were measured by (K/S) reflectance values at 680 nm from the Kubelka-Munk equations. This procedure was previously described herein.

The dye depths of the compositions set forth in Table I are shown in Table XIII set forth below:

TABLE XIII

| Composition | Dye Depth K/S |
|---|---|
| A | 2.7 |
| B | 10.2 |
| C | 14.6 |
| D | 21.1 |
| E | 4.6 |
| F | 6.3 |
| G | 11.2 |
| I | 17.4 |
| K | 6.7 |
| M | 16.3 |
| N | 11.9 |
| Q | 9.7 |
| S | 12.5 |
| T | 7.0 |
| U | 14.5 |
| V | 12.9 |
| W | 19.2 |
| X | 11.5 |
| Y | 5.1 |
| Z | 7.2 |
| a | 10.5 |
| b | 5.8 |
| c | 11.9 |
| d | 21.3 |
| e | 10.1 |

From this table it can be seen that the compositions of this invention have improved dyeability over polyethylene terephthalate fibers, composition A.

This key property, dye depth, is illustrated in FIG. 1. FIG. 1 shows the relationship between dye depth and amount of structural modifying unit. In this figure dye depth (K/S) is the ordinate and the weight percent of structural modifier unit is the abscissa. Four curves are shown on this figure.

Curve 1 represents compositions T, U, V and W; curve 2 represents compositions E, F, G and I; curve 3 represents compositions b, c and d and curve 4 represents compositions Y, Z and a.

Curve 1 is representative of those compositions consisting of ethylene terephthalate copolymers prepared from poly(ethyoxy) diols. These compositions exhibit the best dye uptake with the lowest percentage of modifier. Although these compositions exhibit the best dyeability they are deficient to the compositions of this invention in other areas, namely, thermal oxidative stability, light stability and dyed lightfastness as will hereinafter be discussed when reference is made to FIG. 2. Curve 2 is representative of compositions of this invention having a structure shown by Formula V. This curve illustrates the beneficial effect of the polyalkoxylated hydantoin modifier when the $x+y$ component falls within the prescribed range. Curve 3 represents compositions modified with a hydantoin derivative, however, the $x+y$ component is not within the prescribed range of this invention. Curve 4 is representative of polymers having compositions similar to that disclosed in U.S. Pat. No. 3,856,754, also containing a hydantoin derivative. These compositions are shown to exhibit the poorest dyeability.

EXAMPLE 20., Evaluation of Dyed Lightfastness.

Scoured knit tubings of the fibers of compositions l, m, n, o and p were dyed in an aqueous bath in the following manner and were than heat set at constant dimensions at three temperatures for 1 minute. All concentrations are based upon the weight of the fabric. The following three dye formulae were used:

Formula (1): Cream 0.022% Eastman Polyester Blue GLF, Disperse Blue 27
0.040% Eastman Polyester Pink R-LSW, Disperse Red 86
0.106% Latyl[1] Yellow YLW, Disperse Yellow 42

Formula (2): Pastel Green 0.012% Latyl[1] Brilliant Blue BG, Disperse Blue 60
0.019% Resolin[2] Brilliant Yellow 7GL, Disperse Yellow 93

Formula (3): Violet 0.40% Resolin[2] Blue FBLD, Disperse Blue 56
0.60% Eastman Polyester Red FFBL, Disperse Red 60

Dyeing Method

1. The fabrics were prescoured with an aqueous liquor at 180° F 82° C. for 30 minutes with 2.00 g/l mineral spirits, 1.00 g/l Sterox[3] NJ(non-ionic surfactant), 0.50 g/l sodium hydroxide and 40 to 1 liquor to fabric ratio. The scoured fabrics were then rinsed.
2. The dye bath was set at room temperature with: 1.00% sodium phosphate monobasic, 0.50% acetic acid, 2.00% Levegal[2] HTN, 2.00% Avolan[2] IW and 40 to 1 liquor to fabric ratio. The temperature was raised to boil at 1° C/min. The bath was maintained for 60 minutes at boil and then cooled to 180° F 82° C. by radiation. The fabric was then hot rinsed (hot tap water) and dried at 140°-160° F.

1. A trademark of E. I. duPont de Nemours & Co.
2. Trademarks of Verona Dyestuff - Division of Mobay Chemical Corporation.
3. A trademark of Monsanto Company.

The fabrics were scoured after dyeing and evaluated for dyed lightfastness in a manner previously described. The dyed lightfastness was measured against the Gray Scale after 40 hour exposure, these results are set forth below in Table XIV.

TABLE XIV

| | | Gray Scale Rating | | | | | | | | |
|---|---|---|---|---|---|---|---|---|---|---|
| | | Creme | | | Violet | | | Pastel Green | | |
| Comp. | Dye Shade Heat Set Temp. (° F) | 350 | 375 | 400 | 350 | 375 | 400 | 350 | 375 | 400 |
| l | | 4 | 4 | 3-4 | 3-4 | 3-4 | 3-4 | 3-4 | 3-4 | 3-4 |
| m | | 4 | 3-4 | 2-3 | 3 | 3-4 | 3-4 | 4 | 4 | 4 |
| n | | 4 | 3-4 | 3-4 | 4 | 3-4 | 3-4 | 3 | 3 | 2-3 |
| o | | 3-4 | 3 | 2-3 | 2-3 | 3 | 2-3 | 2-3 | 3 | 2-3 |
| p | | 2 | 2 | 1-2 | 2-3 | 2 | 2 | 1 | 1 | 1 |

These results show that compositions l, m and n which contain the hydantoin derivatives of this invention have improved dyed lightfastness over prior art compositions o and p.

EXAMPLE 21., Spinning and Texturizing of Fibers.

The dried pellets of compositions l, m, and n from Example 11 and composition o from Example 12 are fed into a 1.5 inch 3.82 cm extruder with extruder temperatures adjusted to feed a 270° C. polymer melt into an attached melt spinning pump, filter, and spinnerette assembly. Molten polymer is extruded at 295° C. through a spinnerette having 35 holes, each of 9.0 mils diameter. Polymer throughput is at a constant rate of 89.8 g/min. The molten threadline is cooled in a current of air at room temperature and wound up at speeds ranging from 3000 to 4400 yds/min (2743-4023 m/min.). The constant polymer throughput rate gives yarns that vary in denier from 295 denier at 3000 yd/min (2743 m/min) to 201 denier at 4400 yd/min (4023 m/min.).

The spun yarns are simultaneously drawn and false twist textured on a single-position laboratory draw-texturizer. The 40 inch (1.16 m) long primary heater and 16 inch (.41 m) long secondary heater are at 200° C. False twist is inserted at 60 turns per inch (23.6 turns per cm) (of final yarn length) at a point between the heaters, and the forward speed of the yarn at windup is 200 yds/min. (183 m/m). Draw ratios are adjusted to yield drawn, textured yarns of about 30% elongation at break.

Fibers having composition p were spun on 1.5 inch (3.82 cm) screw extruder at 385 yards per minute (346 m/min.). The spun yarn was drawn 4.0X to yield 160 denier yarn (35 filaments) with approximately 30% residual elongation. This yarn was then texturized as above except that there was no further drawing of the yarn during texturizing.

The texturizing results are set forth below in Table XV.

TABLE XV

| Composition | Draw Ratio During Texturizing of Yarn Spun at 3400 Yds/Min, 3100 m/min | Tenacity Grams/ Denier | Elongation % | Dye Depth (K/S) |
|---|---|---|---|---|
| l | 1.70 | 3.91 | 30.9 | 9.5 |
| m | 1.75 | 4.02 | 31.4 | 9.1 |
| n | 1.75 | 3.91 | 28.3 | 8.2 |
| o | 2.00 | 3.18 | 31.0 | 12.4 |
| p Unmodified | Not spinnable at this speed | — | | |

TABLE XV-continued

| Composition | Draw Ratio During Texturizing of Yarn Spun at 3400 Yds/Min, 3100 m/min | Tenacity Grams/ Denier | Elongation % | Dye Depth (K/S) |
|---|---|---|---|---|
| Polyester | 1.70 | 3.60 | 30.0 | 3.7 |

The results shown in Table XV show that the compositions of this invention, viz l, m, n can be spun at high speeds to yield partially oriented yarns that can be texturized to give a final yarn with properties almost equivalent to those of the unmodified polyethylene terephthalate composition. Dye depth was evaluated in the manner previously described in Example 19. The improved dyeability of those compositions containing the polyalkoxylated hydantoin derivative over the unmodified polymer of poly ethylene terephthalate is clearly evident. These compositions are also advantageous in that spinning can be accomplished at high speeds. This cannot be accomplished with composition p. Although prior art composition o is spinnable at 3400 yds/min. (3100 m/min), properties of the texturized yarn are inferior to those of the hydantoin containing compositions as shown in Table XV.

EXAMPLE 22., Spinning and Texturizing of Fibers.

Compositions q, r, s and t from Example 14 wer polymerized in a manner described in Example 21.

The molten polymer from the final stages of the polymerization were spun at 423 yards per minute (388 m/min) through a 35 hole spinnerette to yield a 700 denier fiber bundle. The fiber bundles were drawn over an 80° C, -pin to yield a yarn having approximately 30% residual elongation. The drawn yarns were then texturized as described in the preceding Example 21 for composition p in that the yarns were not drawn further during the texturizing operation.

The texturizing results are set forth below in Table XVI.

TABLE XVI

| Composition | Draw Ratio | Denier | Tenacity Grams Denier | Elongation % | Modulus at 2% Elongation Grams/Denier |
|---|---|---|---|---|---|
| q | 4.53 | 173 | 4.08 | 35.7 | 62 |
| r | 4.56 | 170 | 3.91 | 37.6 | 52 |
| s | 4.02 | 188 | 3.11 | 23.9 | 66 |
| t | 4.50 | 168 | 4.20 | 28.4 | 72 |

It can be seen from the results shown in Table XVI that composition q, containing the polyalkoxylated hydantoin derivative of this invention has properties practically equivalent to those of the unmodified polyethylene terephthalate composition t, and considerably improved properties over composition s which contains a chain branching agent.

The dyed lightfastness of fibers of these compositions was determined after 60 hour exposure in a manner described in Example 20. Results of such testing are set forth in Table XVII.

It can be seen from the results shown in Table XVII that composition q has superior dyed lightfastness to the compositions of the prior art.

The thermal oxidative stability of the fibers described in this example was determined in a manner described in Examples 16, 17, and 18. Specific viscosities of fibers were measured before and after heating in a forced air oven for 5 minutes at various temperatures. The test procedure is previously described herein. These results are set forth below in Table XVIII.

TABLE XVIII

| Composition | Prior to Heating | Specific Viscosity | | | | | |
|---|---|---|---|---|---|---|---|
| | | 140° C. | 160° C. | 180° C. | 200° C. | 220° C. | 230° C. |
| q | 0.380 | 0.376 | 0.387 | 0.385 | 0.377 | 0.178 | 0.155 |
| r | 0.370 | 0.367 | 0.370 | 0.359 | 0.313 | 0.170 | insoluble |
| s | 0.339 | 0.335 | 0.335 | 0.301 | 0.277 | 0.213 | insoluble |
| t | 0.342 | 0.353 | 0.345 | 0.345 | 0.341 | 0.356 | 0.340 |

It can be seen from the results shown in Table XVIII that composition q, containing the polyalkoxylated hydantoin derivative of this invention does not experience thermal degradation until about 200°-220° C. whereas compositions r and s are stable up to about 160°-180° C. At 230° C. these two compositions have degraded to such an extent that they are not soluble in the solvent used for determining viscosity.

Figure 2:
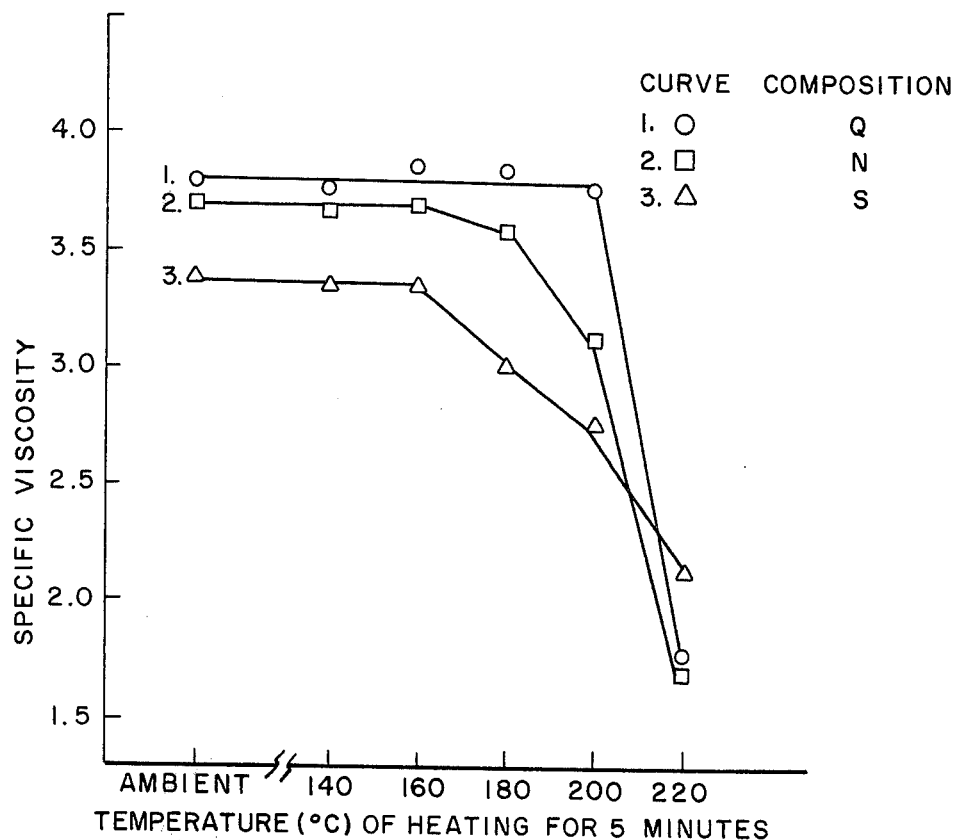
FIG. 2 is a graph showing as the ordinate specific viscosity and as the abscissa temperature (° C) of heating for 5 minutes. The improved thermal stability of the compositions of this invention is shown.

The results of this example are graphically shown in FIG. 2. This figure shows the relationship between specific viscosity and exposure to elevated temperatures, wherein specific viscosity is the ordinate and temperature (° C) of heating for 5 minutes is the abscissa. Curve 1 represents composition q, containing the polyalkoxylated hydantoin of this invention, curve 2 represents composition r, containing poly(ethoxy) diols and curve 3 represents composition s, containing chain-branching agents. FIG. 2 clearly shows that all 3 compositions are stable up to 160° C whereupon exposure to higher temperatures compositions r and s rapidly deteriorate whereas composition q remains stable up to 200° C before noticeable degradation occurs.

EXAMPLE 23., Evaluation of Dye Depth for Compositions O, P.

When the fibers prepared in a manner described in Example 15 were dyed as described in Example 19, dye depth values (K/S) for composition O of 10.8 and for composition P of 12.7 were obtained. The dye depths of these fibers is deeper than the unmodified polyethylene terephthalate, compositions A and t and illustrate that the beneficial effect of the polyethoxlated hydantoin derivative can be obtained in polyethylene terephthalate by means other than random copolymerization.

TABLE XVII

| Comp. | Dye Shade Heat Set Temp. (° F) | Gray Scale Rating | | | | | | | | |
|---|---|---|---|---|---|---|---|---|---|---|
| | | Creme | | | Violet | | | Pastel Green | | |
| | | 350 | 375 | 400 | 350 | 375 | 400 | 350 | 375 | 400 |
| 2 | | 3-4 | 3-4 | 3-4 | 3-4 | 3-4 | 3-4 | 3 | 3 | 2-3 |
| r | | 3 | 3 | 3-4 | 3 | 3 | 2-3 | 2-3 | 2-3 | 2 |
| s | | 2-3 | 2 | 2 | 2-3 | 2-3 | 2 | 1-2 | 1 | 1 |

Esterification does not have to go to completion in order to derive the benefits of the hydantoin compounds. As shown in Table II the melting point for composition O is 256° C and for composition P is 255° C. These melting points are indicative that the fibers are not random copolymers formed by ester interchange between the polyethylene terephthalate and compositions $i$ and $j$ but are either block copolymers having ethylene terephthalate segments of compositions $i$ or $j$, or the fibers may be blends of two compositions.

EXAMPLE 24., Preparation of Composition w.

This example is illustrative of the preparation of block copolyesters containing hydantoin derivatives disclosed in U.S. Pat. No. 3,937,753 and 3,937,755. A homopolyester was prepared from the polycondensation of 1,3-di(carboxyethyl)-5,5-dimethylhydantoin and 1,3 di(2-hydroxyethyl)-5,5-dimethylhydantoin and is identified in Tables I and II as composition v. This polyester has a specific viscosity of 0.134 and softened at 120° to 130° C.

A polyethylene terephthalate prepolymer was polymerized as described in Example 15 and 15.0 grams of composition v was added to the molten prepolymer. A block copolyester fiber was thereafter spun from the autoclave. This new composition is identified as composition w.

The resulting fiber was analyzed to contain 1.04 weight percent nitrogen or approximately 8.4 weight percent of the structural modifier unit (hydantoin containing polyester based upon the total fiber weight). When this fiber was dyed in a manner described in Example 19 a dye depth (K/S) value of 7.4 was obtained. A comparison of this weight percent of 8.4 and resulting dye depth of 7.4 and the weight percent of the modifier of this invention needed to obtain the same dye depth readily show that composition w is not as effective in increasing dyeability as the polyesters containing the polyalkoxylated hydantoin derivatives of this invention. This example clearly illustrates that hydantoin derivatives, to be effective as modifiers for improving dyeability, must contain polyalkoxylated groups linked to the ring nitrogens.

EXAMPLE 25., Determination of Moisture Regain.

Percent moisture regain was determined in a manner herein described. It was measured at different relative humidities and is set forth below in Table XIX.

TABLE XIX

| Composition | Relative Humidity | Percent Moisture Regain | | | |
|---|---|---|---|---|---|
| | | 20% | 56% | 65% | 92% |
| A | | 0.15 | 0.25 | 0.44 | 0.49 |
| I | 0.14 | 0.37 | 0.57 | 0.85 | |
| D | 0.06 | 0.31 | 0.46 | 0.73 | |
| G | 0.18 | 0.31 | 0.53 | 0.67 | |
| B | 0.20 | 0.28 | 0.49 | 0.61 | |
| g | 0.21 | 0.31 | 0.46 | 0.65 | |

The results shown in this table show that the compositions containing the hydantoin derivative all exhibit superior moisture regain compared to the unmodified composition A.

Having described in considerable detail new polyesters modified with polyalkoxylated hydantoin derivatives and further describing processes for making these materials, it is to be understood that modifications and variations may be resorted to without departing from the spirit and sope of the invention, as those skilled in the art will readily understand. Such modifications and variations are considered to be within the spirit and scope of the invention as defined in the appended claims.

I claim:

1. A new fiber-forming composition of matter comprising at least 85 weight percent of the following structural units:

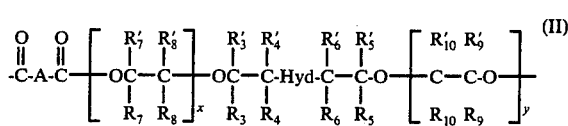

wherein "Hyd" is selected from the group consisting of

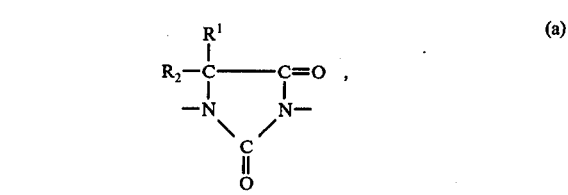

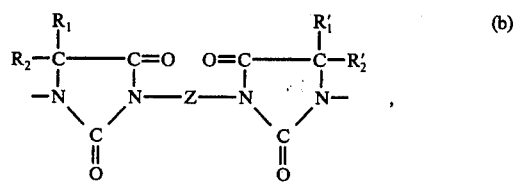

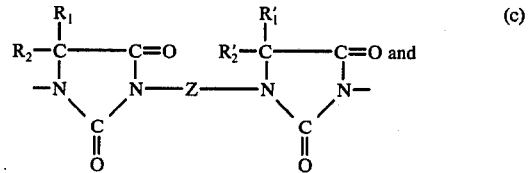

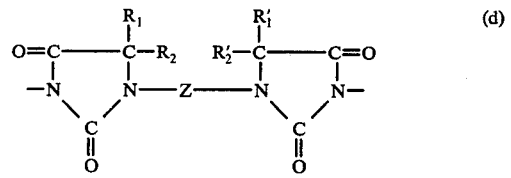

wherein Z is a radical individually selected from the group consisting of bivalent alkyls containing from 1-20 carbon atoms, bivalent aryls containing from 6-10 carbon atoms, bivalent alkyl-aryls containing from 6-20 carbon atoms and cycloalkyls containing from 5-12 carbon atoms;

wherein A is individually selected from the group of aromatic divalent radicals consisting of

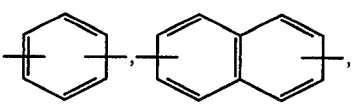

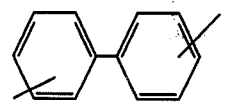

-continued

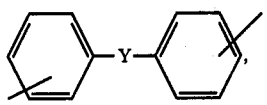

and branched or linear alkylene radicals containing from 4 to 10 carbon atoms, wherein Y is selected from the group of difunctional radicals consisting of a branched or linear $C_1$-$C_4$ alkylene, —O—, —S—, and —$SO_2$—;
wherein

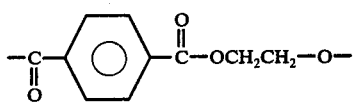

(I)

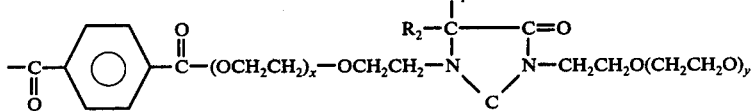

(II)

G is selected from the group of divalent radicals consisting of a branched or linear $C_2$-$C_{10}$ alkylene and $C_5$-$C_{10}$ cycloalkylene; $R_1$, $R_2$, $R_1'$ and $R_2'$ are individually selected from the group of radicals consisting of hydrogen, aryls containing from 6-10 carbon atoms, alkyls containing from 1-20 carbon atoms, and cycloalkyls containing from 5-10 carbon atoms;
$R_1$ and $R_2$ may be cojointly a tetramethylene radical or a pentamethylene radical, $R_3$, $R_3'$, $R_5$, $R_5'$, $R_7$, $R_7'$ and $R_9$, $R_9'$ are individually selected from the group of radicals consisting of hydrogen, methyl, ethyl and saturated cycloalkyls containing from 5-10 carbon atoms; $R_4$, $R_4'$, $R_6$, $R_6'$, $R_8$, $R_8'$ and $R_{10}$, $R_{10}'$ is hydrogen and $R_3$ and $R_4$, $R_5$ and $R_6$, $R_7$ and $R_8$, $R_9$ and $R_{10}$ may be cojointly a tetramethylene radical; wherein x is an integer from 0-20, y is an integer from 0-20 and the sum of $x+y$ is at least 1 and the weight percent of units II is not more than 20.

2. The new composition of matter defined in claim 1 wherein the sum of $x+y$ is up to about 30.

3. The new composition of matter defined in claim 2 wherein the sum of $x+y$ is an integer from 1 to 20.

4. The new composition of matter defined in claim 2 wherein the sum of $x+y$ is an integer from 4 to 15.

5. The new composition of matter defined in claim 1 wherein the weight percent of units II is from about 4 to about 10 weight percent of the total copolymer weight.

6. The new composition of matter defined in claim 1 wherein $R_1$ and $R_2$ are —$CH_3$; A is

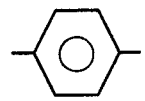

and G is —$CH_2CH_2$—.

7. A new fiber-forming composition of matter comprising at least 85 weight percent of the following structural units:

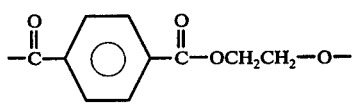

(I)

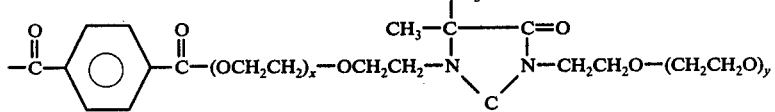

(II)

wherein the weight percent of units II is not more than 20.

8. The new composition of matter defined in claim 7 wherein the sum of $x+y$ is up to about 30.

9. The new composition of matter defined in claim 8 wherein the sum of $x+y$ is an integer from 4 to 15.

10. The new composition of matter defined in claim 7 wherein the weight percent of units II is from about 4 to about 10 weight percent of the total copolymer weight.

11. The new composition of matter defined in claim 7 wherein $R_1$ and $R_2$ are —$CH_3$.

12. A new fiber-forming composition of matter comprising at least 85 weight percent of the following structural units:

wherein the sum of $x+y$ is an integer from 4-15 and the weight percent of units II is from about 4 to 10 weight percent of the total weight.

13. In a process for manufacturing a dye receptive and thermally stable linear condensation polyester modified with a compound containing a polyalkoxylated hydantoin derivative comprising the steps:
mixing together at least one compound selected from the group consisting of terephthalic acid, isophthalic acid and dimethyl terephthalate, and a glycol of the series HO($CH_2$)$_n$OH, in which n is an integer from 2 to 10 and a compound containing a hydantoin derivative having the formula:

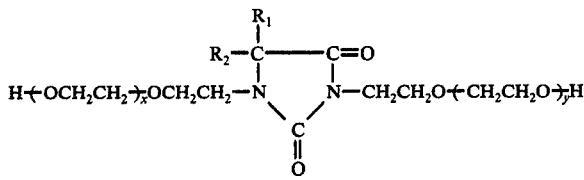

in which $x+y$ is up to about 30, $R_1$ and $R_2$ is a radical selected from the group consisting of hydrogen, aryls containing from 6-10 carbon atoms, alkyls containing from 1-20 carbon atoms and cycloalkyls containing from 5-10 carbon atoms;

reacting said mixture by heating to at least 150° C. in the presence of a suitable catalyst; and continuing said heating and reaction of said mixture until a fiber-forming modified polyester is obtained.

14. The process as defined in claim 13 wherein the sum of $x+y$ is about 30.

15. The process defined in claim 13 wherein the sum of $x+y$ is an integer from 1 to 20.

16. The process defined in claim 13 wherein the sum of $x+y$ is an integer from 4 to 15.

17. The process as defined in claim 13 wherein $R_1$ and $R_2$ are —CH$_3$.

18. The process as defined in claim 13 wherein terephthalic acid and ethylene glycol are reacted with said hydantoin derivative to form said polyester.

19. In a process for manufacturing a dye receptive and thermally stable linear condensation polyester modified with a compound containing a polyalkoxylated hydantoin derivative comprising the steps:

mixing together at least one compound selected from the group consisting of terephthalic acid, isophthalic acid and dimethyl terephthalate, and a glycol of the series HO(CH$_2$)$_n$OH, in which n is an integer from 2 to 10, to form a polymer;

adding to said polymer a compound containing a hydantoin derivative having the formula:

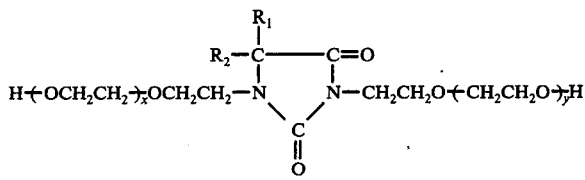

in which $x+y$ is up to about 30, $R_1$ and $R_2$ is a radical selected from the group consisting of hydrogen, aryls containing from 6-10 carbon atoms, alkyls containing from 1-20 carbon atoms and cycloalkyls containing from 5-10 carbon atoms;

reacting said polymer by heating to at least 150° C.; and continuing said heating and reaction of said polymer until a fiber-forming modified polyester is obtained.

20. A fiber having improved dyeability and thermal oxidative stability, comprising the polycondensation product of terephthalic acid, a glycol of the series HO(CH$_2$)$_n$OH, in which n is an integer from 2 to 10 and a polyalkoxylated hydantoin compound.

* * * * *

UNITED STATES PATENT OFFICE
CERTIFICATE OF CORRECTION

PATENT NO. : 4,122,072
DATED : October 24, 1978
INVENTOR(S) : Ernest L. Lawton, II It is certified that error appears in the above-identified patent and that said Letters Patent are hereby corrected as shown below:

Column 1, line 36, "compart" should read ---compact---;

Column 5, line 8, "4,4" should read ---$R_4$---;

Column 7, line 39, "responsive" should read ---responsible---;

Column 9, line 1, "200°" should read ---220°---;

UNITED STATES PATENT OFFICE
CERTIFICATE OF CORRECTION

PATENT NO. : 4,122,072
DATED : October 24, 1978
INVENTOR(S) : Ernest L. Lawton, II It is certified that error appears in the above-identified patent and that said Letters Patent are hereby corrected as shown below:

Columns 11 and 12, Table I, line F read

"F    172130    ""    3.36    "

should read

---F    172130    "    "    3.36---;

line Q read

"Q    190340    "    "    4.96    "

should read

---Q    180340    "    "    4.96---.

UNITED STATES PATENT OFFICE
CERTIFICATE OF CORRECTION

PATENT NO. : 4,122,072
DATED : October 24, 1978
INVENTOR(S) : Ernest L. Lawton, II It is certified that error appears in the above-identified patent and that said Letters Patent are hereby corrected as shown below:

Columns 13 and 14, Table II, line R*, Run No. read "175187"

should read ---172187---;

line Q*, $n_{sp}$ read "0.353"

should read ---0.333---;

line n**, $n_{sp}$ read "0.238"

should read ---0.338---;

line r**, Elongation (%) read "31.6"

should read ---37.6---.

Column 16, line 58, read "(x + y = 15)      (x + y = 15)"

should read ---(x + y = 15)      (x + y = 10)---.

Column 22, line 52, "this" should read ---the---.

UNITED STATES PATENT OFFICE
CERTIFICATE OF CORRECTION

PATENT NO. : 4,122,072
DATED : October 24, 1978
INVENTOR(S) : Ernest L. Lawton, II It is certified that error appears in the above-identified patent and that said Letters Patent are hereby corrected as shown below:

Column 27, line 60 read,

"dye and 8.0% owf Igepon T-Igepon" purchased from", should read

---dye and 8.0% owf Igepon T-33 purchased from---.

UNITED STATES PATENT OFFICE
CERTIFICATE OF CORRECTION

PATENT NO. : 4,122,072

DATED : October 24, 1978

INVENTOR(S) : Ernest L. Lawton, II

It is certified that error appears in the above-identified patent and that said Letters Patent are hereby corrected as shown below:

Column 33, Table XIX, read ---

| Composition | Relative Humidity | Percent Moisture Regain | | | |
|---|---|---|---|---|---|
| | | 20% | 56% | 65% | 92% |
| A | | 0.15 | 0.25 | 0.44 | 0.49 |
| I | 0.14 | 0.37 | 0.57 | 0.85 | |
| D | 0.06 | 0.31 | 0.46 | 0.73 | |
| G | 0.18 | 0.31 | 0.53 | 0.67 | |
| B | 0.20 | 0.28 | 0.49 | 0.61 | |
| g | 0.21 | 0.31 | 0.46 | 0.65 | | should read---

| Composition | Relative Humidity | Percent Moisture Regain | | | |
|---|---|---|---|---|---|
| | | 20% | 56% | 65% | 92% |
| A | | 0.15 | 0.25 | 0.44 | 0.49 |
| I | | 0.14 | 0.37 | 0.57 | 0.85 |
| D | | 0.06 | 0.31 | 0.46 | 0.73 |
| G | | 0.18 | 0.31 | 0.53 | 0.67 |
| B | | 0.20 | 0.28 | 0.49 | 0.61 |
| g | | 0.21 | 0.31 | 0.46 | 0.65 |

UNITED STATES PATENT OFFICE
CERTIFICATE OF CORRECTION

PATENT NO. : 4,122,072
DATED : October 24, 1978
INVENTOR(S) : Ernest L. Lawton, II It is certified that error appears in the above-identified patent and that said Letters Patent are hereby corrected as shown below:

Claim 13, line 59 read,

"In a process for manufacturing a dye receptive"

should read

---A process for manufacturing a dye receptive---.

Claim 19, line 41 read,

"In a process for manufacturing a dye receptive"

should read

---A process for manufacturing a dye receptive---.

Signed and Sealed this

Twenty-fourth Day of April 1979

[SEAL]

Attest:

RUTH C. MASON
Attesting Officer

DONALD W. BANNER
Commissioner of Patents and Trademarks